United States Patent
Ward et al.

(10) Patent No.: US 10,712,548 B2
(45) Date of Patent: Jul. 14, 2020

(54) SYSTEMS AND METHODS FOR RAPID SCANNING OF IMAGES IN DIGITAL MICROSCOPES

(71) Applicant: Microscopes International, LLC, Plano, TX (US)

(72) Inventors: Jonathan C. Ward, Plano, TX (US); Richard K. Rainbolt, Allen, TX (US)

(73) Assignee: Microscope International, LLC, Dallas, TX (US)

( * ) Notice: Subject to any disclaimer, the term of this patent is extended or adjusted under 35 U.S.C. 154(b) by 82 days.

(21) Appl. No.: 15/616,922

(22) Filed: Jun. 8, 2017

(65) Prior Publication Data

US 2018/0356621 A1    Dec. 13, 2018

(51) Int. Cl.
| | |
|---|---|
| G02B 21/24 | (2006.01) |
| G02B 21/18 | (2006.01) |
| G02B 21/36 | (2006.01) |
| G02B 21/08 | (2006.01) |

(52) U.S. Cl.
CPC .......... *G02B 21/241* (2013.01); *G02B 21/18* (2013.01); *G02B 21/367* (2013.01); *G02B 21/086* (2013.01)

(58) Field of Classification Search
CPC ................................................. G02B 21/0084
See application file for complete search history.

(56) References Cited

U.S. PATENT DOCUMENTS

| | | | |
|---|---|---|---|
| 4,066,356 A | 1/1978 | Parker | |
| 4,279,173 A | 7/1981 | Krebs et al. | |
| 5,025,676 A | 6/1991 | Perretta | |
| 5,471,515 A | 11/1995 | Fossum et al. | |
| 5,540,112 A | 7/1996 | Baker et al. | |
| 5,841,126 A | 11/1998 | Fossum et al. | |
| 6,005,619 A | 12/1999 | Fossum | |
| 6,101,265 A | 8/2000 | Bacus et al. | |
| 6,226,392 B1 | 5/2001 | Bacus et al. | |
| 6,272,235 B1 | 8/2001 | Bacus et al. | |
| 6,396,941 B1 | 5/2002 | Bacus et al. | |
| 6,466,690 B2 | 10/2002 | Bacus et al. | |
| 6,522,774 B1 | 2/2003 | Bacus et al. | |
| 6,674,881 B2 | 1/2004 | Bacus et al. | |
| 6,674,884 B2 | 1/2004 | Bacus et al. | |
| 6,711,283 B1 | 3/2004 | Soenksen | |
| 6,775,402 B2 | 8/2004 | Bacus et al. | |
| 6,917,696 B2 | 7/2005 | Soenksen | |
| 7,031,507 B2 | 4/2006 | Bacus et al. | |
| 7,035,478 B2 | 4/2006 | Crandall et al. | |

(Continued)

OTHER PUBLICATIONS

Ekanayake, Virantha, "Detecting Color Vs. Greyscale and Blank Pages During Scanning," available at https://virantha.com/2014/03/30/images-color-and-blank-detection/, Virantha.com, Mar. 30, 2014.

(Continued)

*Primary Examiner* — Jefferey F Harold
*Assistant Examiner* — Justin B Sanders
(74) *Attorney, Agent, or Firm* — Timothy L. Scott

(57) ABSTRACT

Systems and methods for preparing a field image of a portion of a target area or region of interest (ROI) of a microscope slide specimen, and of assembly a plurality of field images into an image of the target area, using a SSM having a movable slide stage, an objective lens, a digital video camera and a digital image sensing element (DIS).

16 Claims, 8 Drawing Sheets

(56) References Cited

U.S. PATENT DOCUMENTS

| | | |
|---|---|---|
| 7,110,586 B2 | 9/2006 | Bacus et al. |
| 7,116,440 B2 | 10/2006 | Eichhorn et al. |
| 7,149,332 B2 | 12/2006 | Bacus et al. |
| 7,235,047 B2 | 6/2007 | MacAulay et al. |
| 7,257,268 B2 | 8/2007 | Eichhorn et al. |
| 7,428,324 B2 | 9/2008 | Crandall et al. |
| 7,457,446 B2 | 11/2008 | Soenksen |
| 7,706,060 B2 | 4/2010 | Mogami et al. |
| 7,755,832 B2 | 7/2010 | MacAulay et al. |
| 7,813,579 B2 | 10/2010 | Oshiro et al. |
| 7,978,894 B2 | 7/2011 | Soenksen |
| 8,027,548 B2 | 9/2011 | Oshiro et al. |
| 8,055,042 B2 | 11/2011 | Soenksen |
| 8,114,625 B2 | 2/2012 | Bocking et al. |
| 8,184,920 B2 | 5/2012 | Oshiro et al. |
| 8,385,619 B2 | 2/2013 | Soenksen |
| 8,664,002 B2 | 3/2014 | Yeung |
| 8,668,640 B2 | 3/2014 | MacAulay et al. |
| 8,755,579 B2 | 6/2014 | Soenksen |
| 9,386,211 B2 * | 7/2016 | Soenksen ............ H04N 5/23206 |
| 10,119,901 B2 | 11/2018 | Casas |
| 10,444,486 B2 | 10/2019 | Rainbolt et al. |
| 2003/0179445 A1 * | 9/2003 | Maenle .................... G01N 1/30 359/368 |
| 2016/0299057 A1 | 10/2016 | Casas |
| 2018/0356621 A1 | 12/2018 | Ward et al. |
| 2019/0072751 A1 | 3/2019 | Rainbolt et al. |
| 2019/0294317 A1 | 9/2019 | Ward et al. |

OTHER PUBLICATIONS

Kayser, K. et al., "From Telepathology to Virtual Pathology Institution: The New World of Digital Pathology," Romanian Journal of Morphology and Embryology, vol. 45, Nov. 1998, pp. 3-9, Germany.

Rojo, M. et al., "Critical Comparison of 31 Commercially Available Digital Slide Systems in Pathology," International Journal of Surgical Pathology, vol. 14, No. 4, Oct. 2006, pp. 285-305.

"Detecting Blank Image Files," available at https://superuser.com/questions/343385/detecting-blank-imag-files, Stack Exchange Network, Oct. 5, 2011, Dec. 3, 2013, Feb. 22, 2015, Apr. 8, 2015, Oct. 9, 2017.

* cited by examiner

SYSTEMS AND METHODS FOR RAPID SCANNING OF IMAGES IN DIGITAL MICROSCOPES

BACKGROUND OF THE INVENTION

This invention relates generally to the field of digital microscopes, and more specifically to digital microscope systems and methods for the rapid scanning of all or portions of a specimen on a microscope slide.

Since the development of the first working optical microscopes by Leeuwenhoek in the late 17$^{th}$ century, magnified images have been used in many different areas of scientific research. Improvements in lenses in the 18$^{th}$ and 19$^{th}$ centuries greatly improved the performance of conventional compound (i.e., multi-lens) microscopes in producing accurate images. The development of the electron microscope in the 20$^{th}$ century allowed scientists to obtain images of structures far smaller than those capable of viewing with optical microscopes. However, the use of optical microscopes at magnifications less than 100× remains highly important in many fields including, without limitation, botany, microbiology, geology, and medicine.

The utility of conventional compound optical microscopes for examining specimens mounted on glass slides is compromised because the field of view (FOV)—the portion of the specimen actually visible to the user at the eyepiece at any given time—becomes smaller as magnification increases. There is an inverse relationship between the optical magnification used to view the specimen and how much of the overall slide may be seen in the eyepiece FOV.

This becomes problematic when a user views the entire slide specimen, or a large part of it, under low magnification to identify a target area (also referred to as a region of interest or ROI) for viewing at high magnification. In optical microscopes, the user must switch objective lenses to a higher power and reacquire a (smaller) portion of the desired area at the higher magnification. Because the FOV at the higher magnification is so small, and because there is no cross-reference to identify the location of the new, higher magnification FOV within the overall slide specimen, the user may frequently miss portions of the ROI, be unsure whether the image acquired at the higher power is actually part of the ROI identified at the lower magnification, or be unsure of where the higher magnification field is located within the larger ROI. Essentially, the user's location within the "forest" of the overall slide becomes lost when focusing on the "trees" of a specific location at higher magnification.

If the user is a pathologist scanning for cancerous cells, in a tissue sample of a patient, for example, this could result in a missed diagnosis and obvious risk to patient health. In different contexts, the user may miss other desired structures, such as a particular cell wall region in a botanical sample, a particular group of microbial cells, specific crystal structures in a geological sample, or an area of high white blood cell counts in a blood sample.

In the last twenty-five years, the use of automated microscopes to generate digital images for examining microscope slides has become increasingly common. A class of microscopes using a combination of optical and electronic image acquisition and processing techniques, known as whole slide imaging (WSI) microscopes, has seen extensive growth. WSI microscopes are automated microscopes that use a camera with a digital image sensor (DIS) to capture a series of optically magnified (e.g., 20×, 40×, 60×, or 80×) digital images of adjacent, very small portions (each of which is usually referred to as a "field" or "tile") of a target area or region of interest (ROI) of a microscope slide specimen. Because WSI microscope images are intended to be displayed on a computer or television screen or monitor, WSI microscopes typically lack the ocular or eyepiece lens in a standard compound microscope. Thus, magnification of the slide specimen is usually provided by a single objective lens (which may include a relay lens for infinity-focused objectives) in optical communication with the DIS. Stated differently, the optical path of a WSI microscope typically replaces the ocular lens with a digital image sensor (DIS).

To create a large, high-resolution image, each field image in the ROI slightly overlaps its adjacent field images, so that the field images collectively cover the entire target area/ROI. The digital field images or tiles scanned by the DIS camera are combined by computer software into a single, large magnified image file of the full ROI, which may in some instances comprise the entire slide. A variety of software algorithms may be used to combine the field images into the composite, magnified ROI image, which is similar to a panoramic image assembled by software from a series of overlapping images on non-microscopic digital cameras. In addition, a series of images at various lesser magnifications of the single, fully magnified ROI image may be created by image processing algorithms to digitally reduce the detail level in the fully magnified ROI, which provides the user with an artificial, digitally created "zoom in/zoom out" ability when viewing the complete ROI image comprising multiple field images.

WSI microscopes also help address the FOV problem noted above by providing an overview image of the entire specimen area of the slide at low (or zero) magnification in a first (overview image) window on a computer screen. The overview image may be taken by an overview camera at low or zero optical magnification and displayed as a thumbnail image in the overview window. With the overview image as a guide, the user may designate one or more target (ROI) areas for higher magnification through the objective lens(es) of the microscope using a pointing device such as a mouse, touchscreen, touchpad, etc.

In some embodiments, the overview image may be digitally enlarged, wherein the overview image is simply magnified by digitally adding additional pixels to create a larger image. The additional pixels, however, add no additional image detail. In this instance, the image appears large on the screen, but the image resolution remains the same. The digitally enlarged (low quality) overview image may assist the user in designating the one or more target or ROI areas for higher magnification and resolution.

In one mode of operation ("browse mode" or "live view mode"), the user may view or browse any area of the specimen at the magnification provided by the objective lens (e.g., 20×, 40×, 60×, etc.). A second (browse mode) window, usually larger than the first (overview image) window, may be displayed on the computer screen or monitor showing the field of view currently received by the digital image sensor from the objective lens of the WSI microscope. An overlaid indication (e.g., a box, crosshairs, or other highlighting) on the overview image is provided to visually designate where the current FOV image of the objective lens (i.e., the image in the browse window) is located within the overview image.

The browse/live view mode thus maps the current FOV of the objective lens back to the overview image of the specimen. In doing so, the user is provided with a visual indication of which "trees" (browse window image) within the slide "forest" (the overview) are being viewed at high magnification at any given time. In WSI microscopes at higher magnifications (e.g., 40× or 60×), the FOV of the objective lens may be so small that visualizing it within the overview image is enhanced by digitally enlarging the overview image in the overview image window, so that the objective lens FOV can be seen as a box or area on the overview image rather than a single point.

In another mode of operation (sometimes referred to as "scan mode," "ROI mode," or "zoom mode"), a portion of the ROI image, obtained by combining numerous individual field images or tiles, may be displayed in a third (scan or ROI mode) window on a monitor or display screen. As previously noted, a target area or ROI may be designed by the user using, e.g., a mouse or touchscreen. The user may then instruct the WSI microscope to scan the ROI in very small portions at high magnification to create a series of overlapping field images, which are then combined into a single, high resolution ROI image, which may be displayed in the third (scan or ROI) window.

The scan mode window may be shown on the monitor in addition to, or instead of, the second (browse mode) window. A small thumbnail image of the ROI may be displayed in a region of the third window (or in a separate fourth window), and a box or highlighted area within the ROI thumbnail image may show which portion of the entire ROI is being viewed in the scan mode window on the screen at any moment. Thus, the larger magnified image in ROI mode is mapped back to a thumbnail image of the entire ROI, similar to the way the browse mode (live or real-time) image from the objective lens is mapped back to the overview image in browse mode.

In some systems, the relative sizes or positions on the computer monitor or display screen of the first (overview) window, second (browse mode) window, and the third (scan or ROI image) may be determined by the user with a mouse or touchpad, allowing a customized viewing screen. In some embodiments, the user may view the overview (first) window and may toggle between the browse (second) window and the ROI image (third) window in the largest portion of the computer monitor or display.

While the overview, browse image, and ROI images have been described as being displayed in separate windows, in some embodiments the images may be displayed without using windows, and specific screen regions or areas may be used to provide different images, or the overview image may be displayed in, e.g., a corner of the browse or ROI images.

WSI microscopes having the foregoing functions and features are described in, e.g., U.S. Pat. Nos. 6,101,265 and 6,711,283, each of which is hereby incorporated by reference in its entirety. A compact WSI microscope having similar features to those described is available from Microscopes International, LLC (Plano, Tex.) with a 20×, 40× or 60× magnification as the uScope MXII microscope.

Although there are significant variations among commercially available systems, a WSI microscope typically includes a movable stage that holds the microscope slide. In some systems, the stage is motorized to move at a constant speed, and digital field images are taken at time intervals synchronized to the stage speed to obtain field images for combination into the high-resolution ROI image. These WSI systems may be referred to as moving image acquisition (MIA) systems. In other systems, the stage is motorized to move rapidly to a series of fixed positions from which the field images of the ROI are captured and subsequently combined. These WSI systems are referred to as fixed image acquisition (FIA) systems, because the image is obtained with the stage in a fixed (i.e., stationary) position. In both MIA and FIA systems, one or more motors are typically provided to move the stage in and out (X axis) and left and right (Y axis).

WSI microscopes also include an illumination system providing light to the slide stage, and an objective lens to magnify the light from the slide specimen and focus it on a digital image sensor (DIS) element in a digital camera. Focusing is typically provided by making one or more of the stage and the camera/objective lens structure (the camera and objective lens in WSI microscopes are typically coupled to a tube to maintain a fixed distance therebetween) movable by a motor (Z axis) capable of finely controlled, small movements on an axis generally perpendicular to the slide stage. This allows structures at different depths within the specimen to be captured in proper focus.

Digital image sensor cameras for WSI microscopes typically involve a CCD (charge coupled device) or a CMOS (complementary metal oxide semiconductor) image sensor as the DIS element. In some WSI systems, the DIS is incorporated into a static (snapshot) camera that captures field/tile images and combines them into a single, high-definition ROI image. In other systems, the DIS is incorporated into a video camera that outputs a stream of video images, from which frames may be captured as still image fields/tiles. Recent trends in digital photography, particularly digital video cameras, have seen a migration toward CMOS digital image sensors, which are most cost-effective than CCD sensors.

For video cameras, each distinct image that is output by the DIS element is known as a frame, and the frame output rates for such video cameras are measured in frames per second (FPS) with typical rates between 10 and 90 FPS. Thus, at a frame rate of 30 FPS (typical for many video cameras), each new image in the video stream is created every 33.33 milliseconds (mSec), which is referred to as the frame time (FT). Similarly, at 50 FPS, the images are captured every 20 mSec. For FIA systems, the images are obtained while the stage is not moving, so any video frame captured while the stage is stationary may be used as the field image or tile.

Once all the field images comprising a ROI have been captured, image combination algorithms are used to combine the field images into a single, high-definition ROI image. Although a variety of image combination algorithms are used, one class of algorithms known as pattern matching algorithms operates by mathematically aligning the edges of adjacent field images until they overlap, and then combining the images at the overlapping region.

A significant limitation associated with WSI microscopes is the time required to take and compile the field images or tiles for combination into the single high definition ROI image. To obtain a ROI image using either a MIA or FIA system, the WSI microscope objective is moved over the ROI, and magnified images are taken of very small areas either while the stage is moving (MIA systems) or fixed/stationary (FIA systems). The X-axis and Y-axis (stage movement) and Z-axis (focus) motors in the WSI microscope must be synchronized with the camera to properly capture digital field images.

In FIA systems, each X-axis, Y-axis, and Z-axis movement to a new stationary position takes a certain time (move time or MT) to occur, and causes a system vibration that requires a certain damping time (Settle Time or ST) to elapse before a new image may be taken without blurring. Thus, Frame Times are limited not only by the move time in moving the camera from a first image position to a second image position, but also by the settle time necessary to resolve the vibrations following the move.

Furthermore, after the settle time, any partially completed video frame output from the camera must be completed before the next video frame can be captured (frame completion time or FCT).

For some field images, called exhaustive focus fields (EFF), multiple images at the same stage position (i.e., X-axis and Y-axis location) are taken at different focus points (Z-axis positions). This involves a Z-axis focusing movement of either 1) the slide stage, or 2) the light path/tube containing the DIS and the objective lens, plus an additional settle time (ST) for the camera vibration associated with the Z-axis movement to dampen out, and a FCT period to complete the video frame output occurring when the Z-axis settle time elapses.

The entire process of completing a single frame for compilation into the ROI image includes the following steps:

1. move the slide stage to a desired (X, Y) location relative to the objective lens (MT);
2. wait for the vibration from the stage motion to dampen out (ST);
3. wait for the current partially completed video frame to finish (FCT);
4. capture the next complete video frame output from the camera;
5. change the focus position (Z axis location) of the objective at the same X, Y location (optional step for multiple images at the same field position to obtain the best focus);
6. wait for the focus (Z-axis) movement to dampen out (optional step for multiple images at the same field position to obtain the best focus);
7. wait for the current partially completed frame to finish (optional step for multiple images at the same field position to obtain the best focus);
8. capture the next complete image output from the camera (optional step for multiple images at the same field position to obtain the best focus);
9. repeat steps 5-8 for multiple images until all images at the same field position are obtained; the multiple images at the same location are referred to as a Z stack (optional step for multiple images at the same field position to obtain the best focus);
10. repeat steps 1-4 (for single-focus images) or 1-9 (for exhaustive focus fields) until all field images for the ROI have been scanned.

Ideally, all movements (X-axis, Y-axis, and Z-axis) would occur instantaneously, and with no settle time. This would allow each field image captured from the camera's video stream to have a valid, usable image. At 50 FPS, the camera would produce 50 field images each second.

In reality, the settle time for the stage (or objective) depends in part on the mass that moves. Thus, a movement of a heavier element (e.g., a DIS/objective lens tube (Z-axis movement), or a stage move (X-axis or Y-axis move) with the mounted slide) takes longer to settle than a lighter one. For a 50 FPS camera, if the total move time+settle time+ frame completion time were less than 20 mSec (the time necessary for the camera to produce a full video image frame), then it would be possible to capture one video image frame and skip one frame while waiting for the move and settle times to lapse. The frame occurring immediately after the skipped frame could be captured and used, and the next movement could then occur, followed by a skipped frame, etc. This would effectively halve the camera frame rate from 50 to 25 images per second.

In most instances, however the move time and settle time exceed one frame time. In such cases, it is necessary to wait for additional whole frame(s) until the MT, ST, and FCT have elapsed. So, at 50 FPS if we ignore 2 frames, the effective FPS is 50÷3=16.67 FPS. If we ignore 3 frames, the effective FPS is 50÷4=12.5 FPS, and so on. Thus, if a Z stack is comprised of 25 images, and 1 frame must be ignored for move time+settle time+frame completion time for each field image of the Z stack, it takes 1.0 seconds to capture all 25 images from the camera.

There is a need for improved scan times and as to minimize one or more of the components of the Field Image Scan Time (e.g., one or more of FT, MT, ST, or FDT) to provide faster ROI images at high definition.

SUMMARY

In one aspect, the present invention relates to a method of preparing a field image of a portion of a target area of a microscope slide specimen using a slide scanning microscope, the slide scanning microscope having a movable slide stage for holding the microscope slide, an objective lens, and a digital video camera optically coupled to the objective lens, the digital video camera having a digital image sensor operating as an M pixels by N lines digital pixel array, the method comprising: performing a first movement to a first stationary position, the first movement selected from a slide stage movement and an objective lens movement, the first movement having a move time and a settle time; determining a line number S of a video frame F output by the digital video camera at the end of the settle time as a complete line; capturing, after the settle time has elapsed, a first field image portion comprising lines S to N of video frame F output by the digital video camera for the M pixels by N lines digital pixel array; capturing a second field image portion comprising lines 1 to (S−1) of video frame F+1 output by the digital video camera for the M pixels by N lines digital pixel array; and assembling the field image using the second field image portion from video frame F+1 and the first field image portion from video frame F.

In one aspect, the present invention relates to a method of preparing an image of a target area of a microscope slide specimen from a plurality of field images, each field image comprising an image of a portion of the target area of the slide specimen, using a slide scanning microscope having a movable slide stage for holding the microscope slide, an objective lens, and a digital video camera having a digital image sensor operating as an M pixels by N lines digital pixel array, the method comprising: capturing each frame image of the plurality of video frame images by: a) performing a first movement to a desired stationary position, the first movement selected from a slide stage movement and an objective lens movement, the first movement having a move time and a settle time; b) determining a line number S of a video frame F output by the digital video camera at the end of the settle time as a complete line; c) capturing, after the settle time has elapsed, a first field image portion comprising lines S to N of video frame F output by the digital video camera for the M pixels by N lines digital pixel array; e) capturing a second frame image portion comprising lines 1 to (S−1) of video frame F+1 output by the digital video camera for the M pixels by N lines digital pixel array; e) assembling the field image using the second field image portion from video frame F+1 and the first field image portion from video frame F; f) repeating steps a-f for each field image in the plurality of video frame images; and g) assembling the plurality of field images to form a single image of the target area.

In one aspect, the present invention relates to a method of preparing an image of a target area of a microscope slide specimen from a plurality of field images, each field image comprising an image of a portion of the target area of the slide specimen, using a slide scanning microscope having a moveable slide stage for holding the microscope slide, at least one objective lens, and a digital video camera having a digital image sensor operating as an M columns by N rows digital pixel array, the method comprising: capturing each field image of the plurality of field images by: a) performing a slide stage movement to move the slide stage to a desired stationary slide stage position, the slide stage movement having a move time and a settle time; b) determining a line number S of a video frame F output by the digital video camera at the end of the settle time as a complete line; c) capturing, after the settle time has elapsed, a first field image portion comprising lines S to N of video frame F output by the scanning video camera for the M pixels by N lines digital pixel array; d) capturing a second field image portion comprising lines 1 to (S−1) of video frame F+1 output by the scanning video camera for the M pixels by N lines digital pixel array; e) assembling the field image using the second field image portion from video frame F+1 and the first field image portion from video frame F; f) performing an objective lens movement to a desired stationary objective lens position, the objective lens movement having a move time and a settle time; g) determining a line number S of a video frame G output by the digital video camera at the end of the settle time as a complete line; h) capturing, after the settle time has elapsed, a first field image portion comprising lines S to N of video frame G output by the scanning video camera for the M pixels by N lines digital pixel array; i) capturing a second field image portion comprising lines 1 to (S−1) of video frame G+1 output by the scanning video camera for the M pixels by N lines digital pixel array; j) repeating steps f-i to obtain a Z-stack of field images at the desired stationary slide stage position, each field image in the Z-stack of field images comprising an image having a different focus from the other images in the Z-stack; k) retaining one field image of the Z-stack of field images as the field image for the desired stationary slide stage position; l) repeating at least steps a-e to capture each of the plurality of field images; and assembling the plurality of field images to form a single image of the target area.

In one aspect, the present invention relates to a slide scanning microscope system for preparing an image of a target area of a microscope slide specimen from a plurality of field images captured from a series of stationary slide stage positions using a digital video camera, each field image comprising an image of a portion of the target area of the slide specimen, the slide scanning microscope system comprising: a slide scanning microscope comprising: a movable slide stage for holding a microscope slide having a specimen thereon; at least one slide stage motor capable performing a slide stage movement to move the movable slide stage to a desired stationary slide stage position, the slide stage movement having a settle time; an overview camera for capturing an overview image of the specimen; at least one objective lens for magnifying light received from the specimen; at least one objective lens motor, wherein each of the at least one objective lens motors is coupled to one of the at least one objective lenses, each of the at least one objective lens motors being capable of performing an objective lens movement to move the objective lens coupled to the motor to a desired stationary objective lens position, the objective lens movement having a settle time; at least one illuminator, wherein each of the at least one illuminators is optically coupled to one of the at least one objective lenses and includes a light source to illuminate the specimen; at least one digital video camera, wherein each of the at least one digital video cameras is optically coupled to one of the at least one objective lenses, each of the at least one digital video cameras having a digital image sensor operating as an M pixels by N lines digital pixel array and outputting video images as a series of frames, each frame comprising N lines each having M pixels of data; and a microscope control unit comprising: a high speed computer interface for transmitting data and commands between a computer system and the slide scanning microscope; and a CPU for determining, in response to a slide stage movement or an objective lens movement, a line number S of a video frame F output by the digital video camera at the end of the settle time as a complete line; and a computer system comprising: a slide scanning microscope control unit, the SSM control unit being capable of: assembling a plurality of field images, each field image assembled in response to a slide stage movement or an objective lens movement by: receiving from the digital video camera via the high speed computer interface a first field image portion comprising lines S to N of a video frame F output by the digital video camera; receiving from the digital video camera via the high speed computer interface a second field image portion comprising lines 1 to (S−1) of a video frame F+1 output by the digital video camera; and assembling the field image from the first field image portion and the second field image portion; and assembling the plurality of field images to form a single image of the target area; and a monitor for displaying at least a portion of said single image of the target area.

DESCRIPTION

Figure 1:
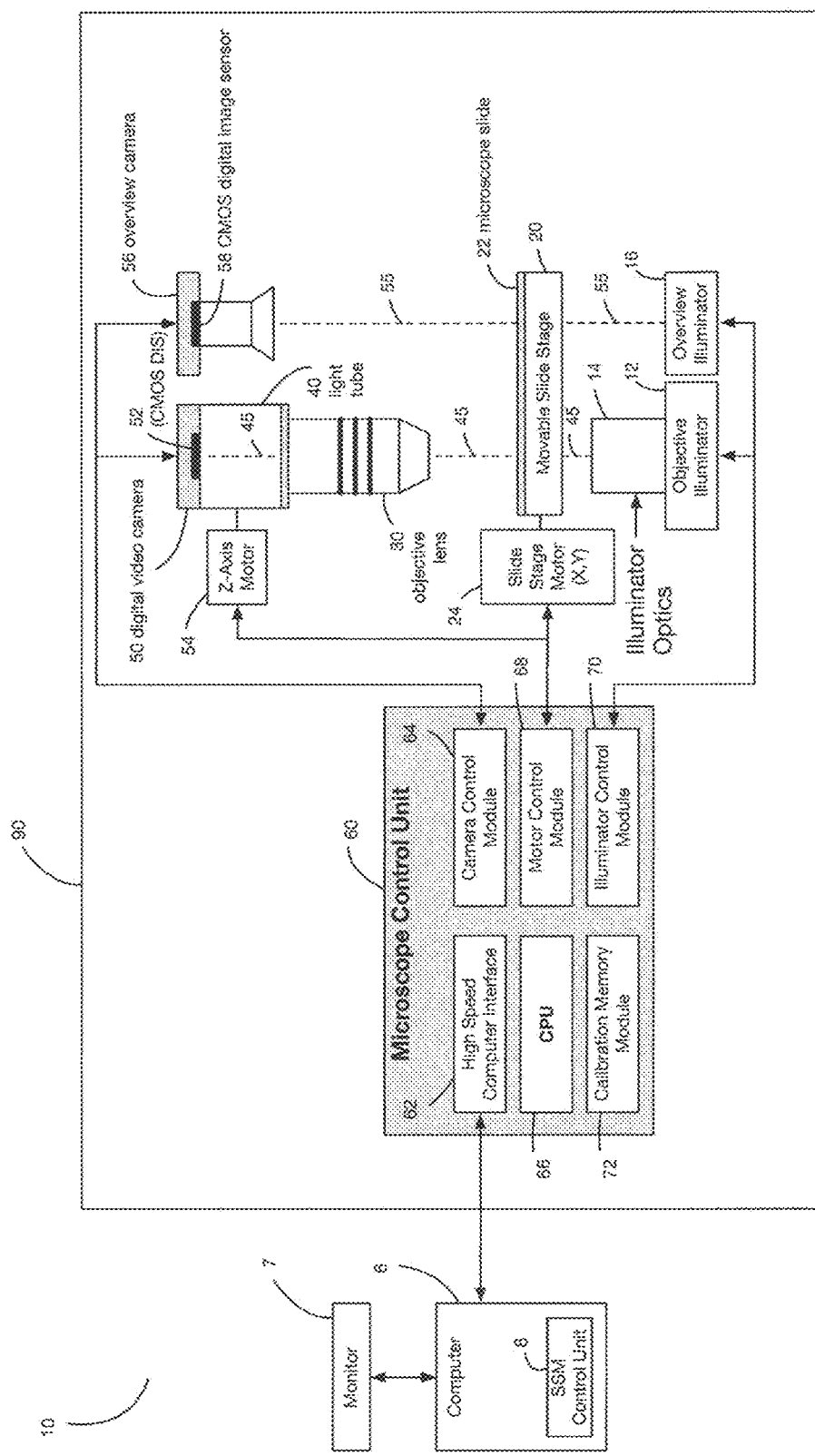
FIG. 1 is a block diagram of one embodiment of a slide scanning microscope system according to the present invention.

Exemplary embodiments of the present disclosure are illustrated in references Figures of the drawings, which are illustrative rather than restructure. No limitation on the scope of the technology or on the claims that follow is to be implied or inferred from the examples shown in the drawings and discussed here.

Some aspects of the invention involve slide scanning microscopes (SSMs). Some embodiments of such microscopes disclosed herein may be used in conjunction with a personal computer, e.g., a PC or an Apple computer having a monitor or display/television screen, coupled to the SSM. Thus, certain embodiments of the invention may include an external computer system having a monitor or display screen as part of a SSM system. In some embodiments, the SSM may include a processor or single-board computer (SBC), and certain embodiments of the invention may include an SSM system that does not require an external computer system. In one embodiment, the SSM may include a processor or SBC, and may be directly coupled to one or more of a display monitor or screen and a user input/output device included as part of the SSM system, without the need for an external computer.

In one aspect, embodiments of the present disclosure include systems and methods for preparing a field image of a portion of a target area or region of interest (ROI) of a microscope slide specimen using a SSM having a movable slide stage, an objective lens, a digital video camera and a digital image sensing element (DIS).

In one aspect, embodiments of the present disclosure include systems and methods for preparing an image of a target area or ROI of a microscope slide specimen from a plurality of field images using a SSM having a movable slide stage, an objective lens, and a digital video camera having a digital image sensor (DIS).

In one aspect, embodiments of the present disclosure include systems and methods for rapidly preparing a frame image of a digital video camera having a digital image sensor.

In one aspect, embodiments of the present disclosure include systems and methods pertaining to a compact slide scanning microscope having an illuminator, a polarizer, and a rotatable polarity analyzer for analyzing the optical rotational activity of a birefringent microscope specimen. In one embodiment, the SSM further includes a movable slide stage, at least one objective lens, and a digital video camera having a digital image sensor (DIS). In one embodiment, the polarizer is positioned between the illuminator and the movable slide stage. In one embodiment, the rotatable polarity analyzer is positioned between the at least one objective lens and the DIS. The rotatable polarity analyzer may be rotated by an analyzer motor through a rotational range of at least a portion of a circle which may comprise 90 degrees, 180 degrees, or 360 degrees, or more in various embodiments. In one embodiment, the SSM includes two separate light paths for analyzing the specimen, each light path including an illuminator, a first polarizer, an objective lens, a polarity analyzer having a rotatable second polarizer, and a digital video camera having a digital image sensor. In another embodiment, the SSM includes two separate light paths, with a first light path being a polarized light path and a second light path being a brightfield, nonpolarized light path with no first polarizer and no rotatable second polarizer.

In one aspect, embodiments of the present disclosure include systems and methods pertaining to a compact slide scanning microscope for coupling to a computer, the slide scanning microscope having a volume of 0.75 cubic feet or less and including two separate light paths for analyzing a microscope specimen, each light path including an illuminator, an objective lens, and a digital video camera having a digital image sensor. In one embodiment, each light path further includes a rotatable polarity analyzer. In various embodiments, one or both of the two light paths may comprise a brightfield light path, a darkfield light path for dark field imaging, or a polarized light path. The brightfield light paths may comprise a standard focused light path having a fixed focal length (e.g., 160 mm), or an infinity focus light path in which the objective lens is an infinity focused lens coupled to a relay lens to focus the light from the objective lens at a desired focus point.

In one aspect, embodiments of the present disclosure include systems and methods for determining a settle time for one or more movements associated with a slide stage or an objective lens of a slide scanning microscope.

A significant limitation associated with SSMs is the time required to take and compile the field images for combination into a single, high resolution target (i.e., ROI) image. For example, a ROI image of a 15 mm×15 mm section of a sample at 20× magnification, may require approximately 2900 individual field images. A video camera having a CMOS DSI, operating at a data rate of 40 MHZ (i.e., 40 megapixels of data output per second) in Standard Definition (SD) image mode having a frame size of 960 columns by 540 lines (i.e., 0.5184 Megapixels (Mpix) per frame), produces a frame rate (FR) of approximately 74 frames/second (a frame time (FT) of 13.5 mSec/frame). If there were no delays associated with movement, settling, and frame completion (i.e., if each field image of the ROI could be obtained from consecutive frames output by the video camera), the 2900 field images would require about 39.2 seconds (2900 frames÷74 frames/sec) to fully scan all of the field images in the ROI.

However, each of the 2900 field images is associated with an X-axis or a Y-axis move to a new position which may require, for example, a move time (MT) of about 65 mSec or 35 mSec, respectively. In addition, a settle time (ST) of about 150 mSec may be required after each move to ensure that all vibrations have damped out. Even after the move and settle time have elapsed, there is an additional Frame Completion Time (FCT) associated with the completion of the then-current frame being written to the camera from the digital image sensor (DIS) before the next frame begins and a complete frame can be captured as a field image. Because the camera may be outputting data to any of the 540 lines of the DIS, after the move and settle times have lapsed, the average FCT should be about half the maximum (without move, settle-time, and frame-writing del) frame rate, or 6.5 mSec (half of the 13.5 mSec frame time).

Thus, for each of the 2900 field images of the ROI, the Field Image Scan Time (FIST) is the sum of the frame time+move time+settle time+frame completion time (TST=FT+MT+ST+FCT. For the system described above, TST(Y)=13.5+35+150+6.5=205 mSec for a Y-axis move (FR=4.878 frames/sec), and TST(X)=13.5+65+150+6.5=235 mSec for an X-axis move (FR=4.255 frames/sec. At these rates, scanning all 2900 field images for the full ROI would require 594.5 seconds assuming only Y-axis movement, and 681.5 seconds assuming only X-axis movement. By scanning frames in the Y-axis direction first, the moving the X-axis one unit, the tiles can be scanned using predominantly Y-axis movements to improve speed. However, even if all of the field images could be scanned using Y-axis movements, the delays would mean that almost 10 minutes are required for the complete scan.

Note that the foregoing example neglects Z axis movements for each of the 2900 field images of the ROI. As previously noted, however, exhaustive focus fields (EFF)

require multiple field images of the same slide area (X-Y location), with small Z-axis movements between each field image in the EFF to obtain images at different focal depths within the slide specimen. Algorithms may then be performed to identify the frame with the best focus, and the best-focused field image is used in the single ROI image. For EFF having multiple Z-axis movements, there are further delays associated with the Z-axis move time (MT of about 3 mSec) and settle time (ST=35 mSec), and Frame Completion Time (about 6.5 mSec on average) necessary for the start of the next video frame after the settle time has elapsed, as well as the Frame Time to capture each frame of the EFF. Although move times and settle times for Z-axis movements are smaller than those for X-axis and Y-axis moves because the movements are much shorter in distance and duration, the multiple images for the exhaustive focus fields may add additional minutes to the total scan time for the ROI.

FIG. 1 is a block diagram of a slide scanning microscope (SSM) 10 according to one embodiment of the present invention. The SSM 10 is intended to be coupled to a computer system 5 having a SSM control system 8 in a computer 6, and a monitor or display screen 7 for displaying images generated by the SSM. A variety of computer systems 5 are suitable for use with the slide scanning microscope 10, but are not discussed fully herein for ease of discussion. The computer system 5 may be coupled to the SSM 10 by a high-speed computer interface 62 (e.g., USB 2.0 or higher, ethernet, or Thunderbolt) within a microscope control unit 60 to be discussed more fully below. In some aspects of the invention, a slide scanning microscope system may include an SSM 10 as well as a computer system 5. In another aspect, the SSM 10 may include a processor or SBC 88 that is capable of receiving user commands from a user input/output device 9 and controlling a display screen or monitor 7, as more fully explained in FIG. 2.

In the embodiment of FIG. 1, the SSM 10 includes two cameras: an overview camera 56 for an overview light path 55 to capture an overview image of the slide specimen, and a digital video camera 50 coupled to an objective lens 30 for an objective light path 45 to view magnified images of portions of the slide specimen. Overview camera 56 is used to obtain a complete image of a specimen (not shown) on a microscope slide 22 at either a low or zero magnification (e.g., 4× or less). Overview camera 56 may be a still image (snapshot) camera or a video camera used to capture a single image of the specimen on the microscope slide 22. In the embodiment of FIG. 1, the overview camera 56 is a video camera, and includes a CMOS digital image sensor (DIS) 58. In an alternative embodiment, the overview camera may use a CCD image sensor. The overview image allows a user to see, in browse mode operation, where the objective lens's current FOV is located within the overview image. In scan or zoom mode, the overview image indicates (e.g., by highlighted boxes) where the user has designated one or more target (ROI) areas.

An overview illuminator 16 provides a light source to enable the CMOS digital image sensor 58 of overview camera 56 to capture the overview image. Light from the illuminator 16 follows light path 55 through a movable slide stage 20 and microscope slide 22 to the CMOS DIS 58.

An objective illuminator 12 provides a light source for viewing the specimen on the microscope slide 22. Illuminator optics 14 may comprise a condenser, a diaphragm and one or more filters for focusing the light on the specimen. Light from the objective illuminator 12 follows light path 45 through the illuminator optics 14, movable stage 20 and microscope slide 22, an objective lens 30, and a light tube 40 to a CMOS DIS 52 that is part of a digital video camera 50.

Movable slide stage 20 comprises a generally planar platform that is movable in X and Y directions in the plane of the platform. The movable slide stage 20 includes retainers (not shown), e.g., springs or clips, for securely holding a microscope slide 22 in position on the slide stage 20. In some embodiments, the movable slide stage 20 may include a recessed area for receiving the microscope slide 22 and to assist in maintaining it in position.

One or more slide stage motors 24 is coupled to the movable slide stage 20 and is capable of moving the slide stage 20 and slide 22 rapidly in small increments or steps to a series of stationary positions from which field images may be taken by the digital video camera 50. In one embodiment, separate motors 24 are provided for X-axis and Y-axis movements of the movable slide stage 20. In another embodiment, a single motor 24 is provided for both X-axis and Y-axis movements. As previously noted, the X-axis and Y-axis movements are each associated with a move time (X-axis move time and Y-axis move times, which may be different) and a settle time (X-axis settle time and Y-axis settle time, which likewise may be different). To minimize the move settle time, the movable slide stage 20 may be fabricated from lightweight materials (e.g., lightweight metals or polymers).

Field images may have a dimension of approximately 460 microns×258 microns for a 20× microscope. The slide stage motors 24 are capable of moving the slide with a resolution much smaller than the size of a field image. For example, a step size of 1.25 microns may be used in one embodiment, while a step size of 0.4 microns may be used for another embodiment, although it will be understood that any step size above 0.1 microns can be employed. It will be appreciated that for most field images, the slide stage motor 24 will be commanded to perform X-axis or Y-axis movements on the order of several hundred steps in length to move the stage from a first position at which a first field image is obtained to a second position at which a second field image is obtained that slightly overlaps the first field image.

In some embodiments, the step size for the incremental movement of the movable slide stage 20 by the slide stage motor 24 may be programmable, e.g., in increments of 0.1 microns, to a suitable step size to enable field images of the appropriate size for combination to form a complete image of the target area or ROI. As may be appreciated, the resolution available in moving the slide stage 20 is significantly more precise than necessary for ensuring that field images are obtained with an adequate overlap to enable combination into a single target/ROI image.

Referring again to FIG. 1, the slide scanning microscope 10 includes an objective lens 30 having a desired magnification, such as 4×, 10×, 20×, 40×, 60×, 100×, etc. Objective lens 30 magnifies the light passing along light path 45 through the microscope slide 22. A variety of commercially available objective lenses 30 may be employed, depending upon the requirements of the intended use. In one embodiment, objective lenses 30 having a numerical aperture in the range of about 0.1 to about 1.25, may be used. Suitable lenses may be finite or infinity-focused, and may provide a variety of optical corrections for, e.g., chromatic and spherical aberrations, etc.

Figure 7:
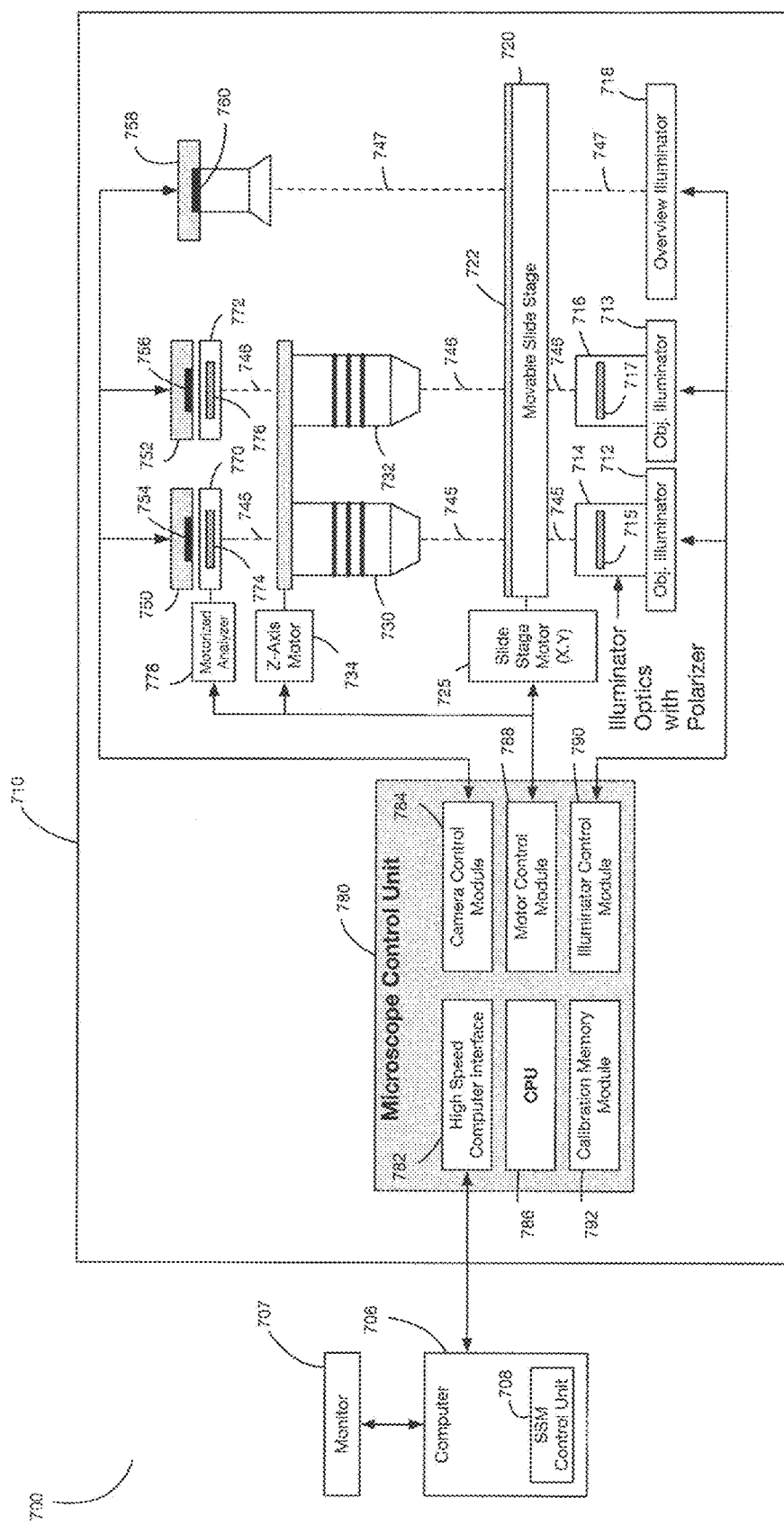
FIG. 7 is a block diagram of one embodiment of a whole slide imaging microscope according to the present invention.
Figure 8:
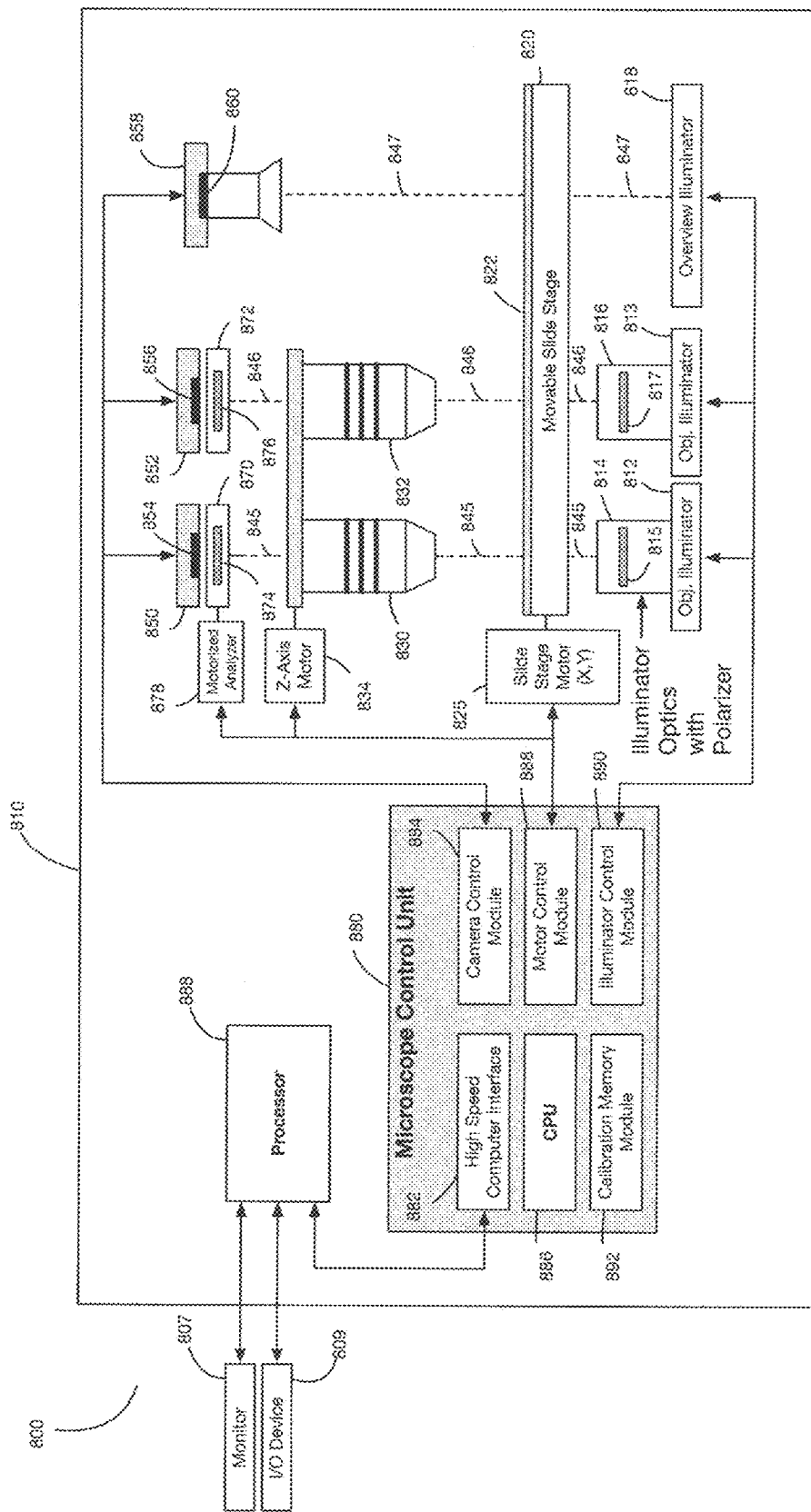
FIG. 8 is a block diagram of one embodiment of a while slide imaging microscope according to the present invention.

In some embodiments of the SSM 10, a light tube 40 may be provided coupling the objective lens 30 to a digital video camera 50. The light tube provides a fixed length between the objective lens 30 and the digital video camera 50. In alternative embodiments, e.g., as shown in FIGS. 7 and 8, light tube 40 may be omitted.

A CMOS digital image sensor 52 in digital video camera 50 receives light along light path 45 from the objective lens 30. Light path 45 passes through light tube 40 to minimize extraneous sources of light that may distort the image generated by digital video camera 50. In alternative embodiments (not shown) the DIS may be a charge coupled device (CCD). In a further alternative embodiment (not shown) the digital video camera 50 may comprise a still (i.e., non-video) camera. The digital video camera 50 preferably operates at a high data rate (e.g., 30 MHz or higher). In one embodiment, the data rate of the digital video camera 50 may be programmable to a desired data rate less than a maximum data rate at which the digital video camera 50 is capable of operating. For example, a digital video camera 50 capable of operating at 48 MHz (i.e., transmitting data at 48 Mbytes/second) may be programmed to operate at 42 MHz to work optimally with a particular image processing system, computer system, and/or computer monitor.

The focus point of the specimen's image on the CMOS DIS 52 may be adjusted by a Z-axis motor 54, which moves the combined structure of the objective lens 30, light tube 40, and digital video camera 50 (including the CMOS DIS 52) in an axis generally perpendicular to the microscope slide 22 and movable slide stage 20. As previously noted, the Z-axis motor is used for exhaustive focus fields (EFF) to obtain a plurality of field images at different focus depths of the same slide area (i.e. microscope stage position). Small Z-axis movements between each field image are used to obtain the plurality of EFF images having different focus depths, which is commonly referred to as a Z-stack. Z-axis movements are associated with a Z-axis move time and a Z-axis settle time.

In some embodiments, image analysis software (e.g., in computer system 5 or microscope control unit 60 of FIG. 1, or processor 88 of FIG. 2) may be used to determine a focus value for each image of the Z-stack. In one embodiment, an image of the Z-stack having the most appropriate focus value is retained as the image associated with the particular (X-axis, Y-axis) location. In another embodiment, the image analysis software may determine focus values for one or more portions or sub-elements of the images of the Z-stack, and may assemble a field image for the particular location by selecting various portions from different images of the Z-stack based on the respective focus values of each portion, such that the field image for use in assembling a combined ROI image is a composite field image comprising image portions from a plurality of images of the Z-stack.

Hardware components of the slide scanning microscope 10 are electrically controlled by a microscope control unit 60. The microscope control unit may comprise hardware, software and/or firmware in a variety of configurations to accomplish the microscope tasks and operations discussed herein. While a variety of different hardware, software and firmware configurations may be used to achieve the control functions noted below, such configurations are deemed to be within the scope of the invention except as specifically excluded by the claims.

In the embodiment shown in FIG. 1, SSM 10 includes a case 90 within which substantially all of the foregoing except computer system 5 are housed. Thus, case 90 provides a protective enclosure for the moveable slide stage 20, motors 24 and 54, overview camera 56 and digital video camera 50, objective lens 30, illuminators 12 and 16 as well as illuminator optics 14; and microscope control unit 60. In this embodiment, SSM 10 provides a compact slide scanning microscope capable of coupling via a high-speed computer interface 62 (e.g., USB 2.0 or higher, ethernet, or Thunderbolt) to a computer system 5 which may comprise any of a variety of commercially available computer systems. In the embodiment of FIG. 1, computer system 5 is external to the SSM 10 as housed within case 90.

A user of the SSM 10 may provide commands from a computer system 5 to the microscope control unit 60 of the SSM via a high-speed computer interface 62. Computer system 5 includes a SSM control unit 8 in a computer 6, and a monitor or display 7. In one embodiment, SSM control unit 8 includes a graphical user interface (GUI) which may be displayed on the monitor 7. The SSM control unit 8 of computer system 5 comprises one or more of hardware, firmware and software to enable the user to exchange commands and data with the SSM 10.

In one embodiment, the high-speed computer interface 62 of microscope control unit 60 comprises a microcontroller with integrated USB functionality. In a specific embodiment, the microcontroller with integrated USB functionality includes a high-performance GPIB (General Purpose Interface Bus) that may be used to directly drive the USB bus from the video data stream of the digital video camera 50. In some embodiments, commands may be either handled directly by the high-speed computer interface 62 or routed to a Central Processing Unit (CPU) 66 for handling.

In one embodiment, a Central Processing Unit (CPU) 66 is included in the microscope control unit 60, and commands from the SSM control unit 8 of computer system 5 that are received by the high-speed computer interface 62 are forwarded to the (CPU) 66, which may process the commands to one or more of a camera control module (CCM) 64, a motor control module (MCM) 68, or an illuminator control module (ICM) 70. CPU 66 comprises, in a particular embodiment, a high-performance microcontroller capable of responding quickly (e.g., within 10-25 nanoseconds) to commands and data received from the SSM control unit 8 of computer system 5, or other modules or components of the slide scanning microscope 10. The CPU 66 is adapted to rapidly switch control lines for, e.g., motors, illuminators, and camera control. In alternative embodiments, the functions of CPU 66 may be provided by microprocessors, circuitry, software and/or firmware elsewhere in the microscope control unit 60 including, e.g., camera control module 64, motor control module 68, or illuminator control module 70.

In the embodiment illustrated in FIG. 1, a calibration memory module (CMM) 72 is used to store various calibration data and parameters for the SSM 10. In some embodiments, the CMM 72 may be omitted from the MCU 60. In one alternative embodiment, a CMM may be provided as part of SSM control unit 8 of computer system 5. In another alternative embodiment, calibration data in a CMM may be provided as part of a processor or SBC 88 (FIG. 2) that is capable of receiving user commands from an input/output device 9 and controlling a monitor or display screen 7.

Referring again to FIG. 1, although not specifically illustrated in microscope control unit 60 or its modules 62-72, numerous additional structures may be provided therein, such as memory modules, clocks, relays, switches, etc., to accomplish the foregoing tasks as discussed for each of the MCU 60, high speed computer interface 62, CCM 64, CPU 66, MCM 68, and CMM 72.

As shown in FIG. 1, an illuminator control module (ICM) 70 controls the operation of illuminator 12 and illuminator optics 14. Commands for adjusting the illuminator level from 0-100% of brightness may be sent by the user from the SSM control unit 8 of computer system 5 via the high-speed computer interface 62. In one embodiment, the illuminator commands may be routed to the CPU 66, which in turn commands the ICM 70 to set the illumination level according to the command from the SSM control unit 8. In alternative embodiments, illumination commands may be routed directly from the high-speed computer interface 62 to the ICM 70 and handled by a processor in the ICM, which directly regulates the illumination level. In one embodiment, an acknowledgement (ACK) signal may be returned to the computer system 5 via the high-speed computer interface 62 to indicate completion of the command, which may be displayed to the user on the monitor or display 7.

A motor control module (MCM) 68 is used to control the operation of the motor(s) for moving the movable slide stage 20 (X-axis, Y-axis) and the combined structure of the objective lens 30, light tube 40, digital video camera 50, and CMOS DIS 52 (Z-axis movement). Commands from the SSM control unit 8 of computer system 5 may be sent by the user to activate the one or more motors for moving the movable slide stage 20 (X and Y-axis movement), and to activate the motor for moving the lens/tube/camera/CMOS assembly (Z-axis movement). In one embodiment, the motor commands may be routed to the CPU 66, which in turn commands the MCM 68 slide stage (X-Y) or objective (Z-axis) motors to move. In alternative embodiments, motor commands may be routed directly to the MCM 68 and handled by a processor in the MCM, which directly regulates the activity of the motors as instructed by the command. In one embodiment, an acknowledgement (ACK) signal may be returned to the computer system 5 via the high-speed computer interface 62 to indicate completion of the command, which may be displayed to the user on the monitor or display 7.

A camera control module (CCM) 64 is used to control the operation of the digital video camera 50 in acquiring field images for combining into a ROI image. Commands from the SSM control unit 8 of computer system 5 may be sent by the user to cause the digital video camera 50 to acquire one or more field images. In one embodiment, the camera commands may be routed to the CPU 66, which in turn commands the digital video camera 50 to acquire the image or images. In alternative embodiments, camera commands may be routed directly to the CCM 64 and handled by a processor in the CCM, which directly regulates the activity of the digital video camera 50 according to the command instruction. In one embodiment, the image data for the digital video camera 50 is processed by the camera control module, which passes the image data to the high-speed computer interface 62. In one embodiment, this may include hardware to enable the image data to be processed at the high data rates output by the digital video camera 50. In a particular embodiment, the hardware may include a gate controlled by the by the CPU which interrupts the flow of image data during the move time and the settle time. In one embodiment, an acknowledgement (ACK) signal may be returned to the computer system 5 via the high-speed computer interface 62 to indicate completion of the command, which may be displayed to the user on the monitor or display 7.

In some embodiments, the SSM control unit 8 of computer system 5 may be enabled to send combination commands (e.g., move the slide stage 20 to a new position and acquire a field image using the digital video camera 50 after the move; move to a new X, Y position and capture a Z-stack of images from a first Z-axis position to a second Z-axis position. Many such combined commands may be used to avoid repeated or routine tasks that may execute slowly due to interface bus latencies.

Figure 2:
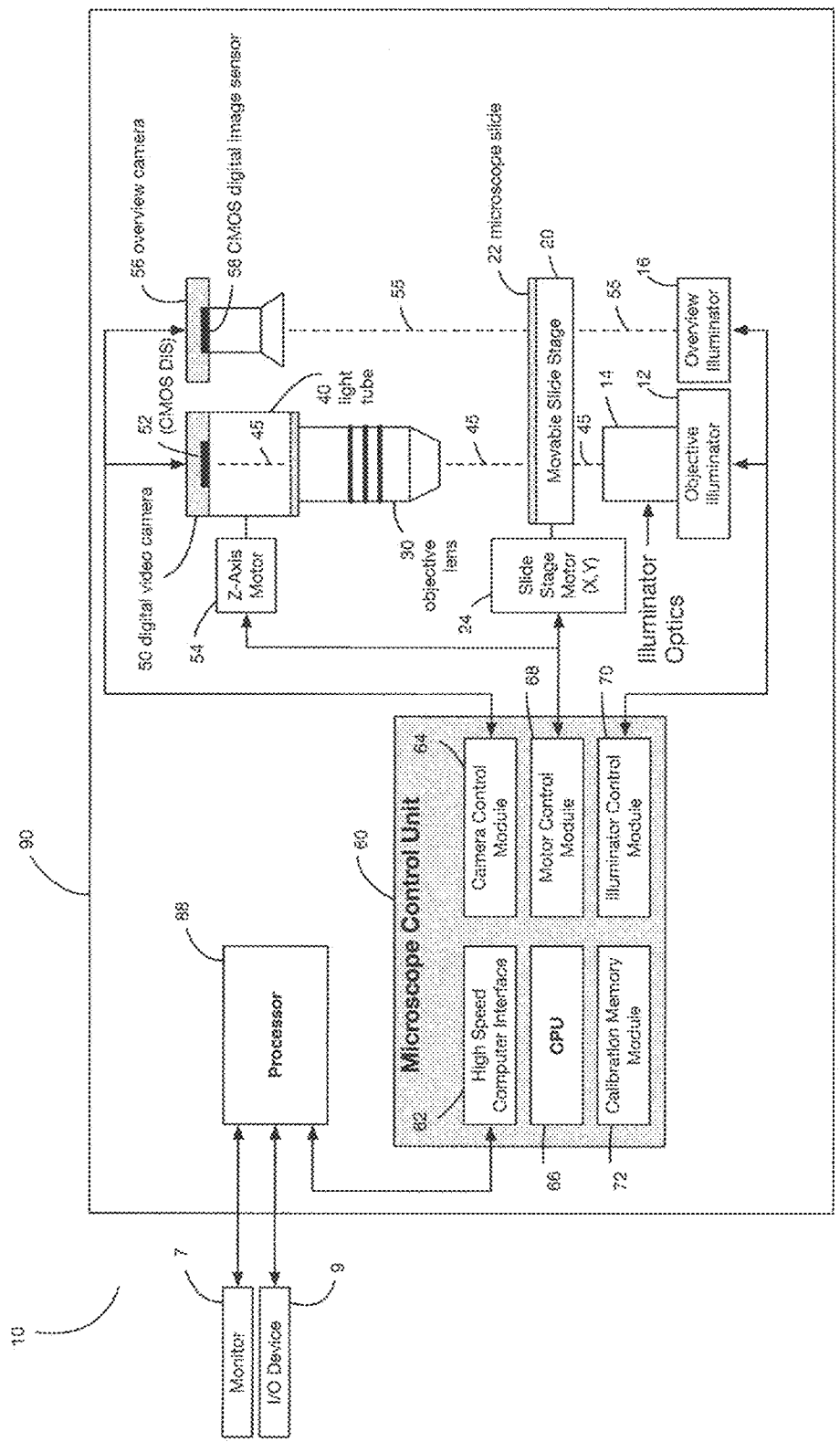
FIG. 2 is a block diagram of one embodiment of a slide scanning microscope system according to the present invention.

FIG. 2 is a block diagram of a slide scanning microscope (SSM) 11 according to another embodiment of the present invention. SSM 11 of FIG. 2 is similar to SSM 10 of FIG. 1, except that it may be coupled directly to a monitor 7 without an external computer 6, using only a user input/output device 9.

Using like numbers for similar structures in SSM 10 of FIG. 1, SSM 11 of FIG. 2 includes a moveable slide stage 20, motors 24 and 54, an overview camera 56 and a digital video camera 50, an objective lens 30, illuminators 12 and 16 and illuminator optics 14, and a microscope control unit 60. These components of SSM 11 function similarly to the identically-numbered elements of SSM 10 of FIG. 1, and the discussion of each component is omitted for brevity. SSM 11 likewise includes a case 90 housing these components.

SSM 11 includes a processor 88 within case 90 that allows SSM 11 to be coupled directly to a monitor or display 7 (e.g., via an HDMI connector coupled to processor 88) without an external computer. In one embodiment, processor 88 may comprise an operating system that allows the processor to function as a "computer system on a chip," or a single-board computer (SBC) for controlling the SSM 11. To this end, processor 88 comprises a SSM control unit (not shown), similar to SSM control unit 8 of external computer 6 of FIG. 1, that may receive inputs from the user I/O device 9 to control the function of the SSM 11, similar to the identically-numbered component of external computer 6 of FIG. 1. The SSM control unit of processor 88 may include a GUI for display on monitor 7, and includes firmware or software to enable a user to operate the SSM 11 with input/output (I/O) device 9. User I/O device 9 may comprise, as nonlimiting examples in various embodiments, a keyboard, a mouse, or a touchscreen (which may be a touchscreen on monitor 7). In some embodiments (not shown), user I/O device 9 may be provided on an exterior surface of case 90, e.g., as a touchscreen, touchpad, or buttons.

A user of the SSM 11 may provide signals to processor 88 using I/O device 9 to generate one or more commands that are passed to the microscope control unit 60 of the SSM via a high-speed computer interface 62, e.g., to move the slide stage 20 to a new position and acquire a field image using the digital video camera 50 after the move. In the embodiment of FIG. 2, microscope control unit 60 of SSM 11 includes the same units/modules as described for SSM 10 of FIG. 1. In some embodiments (not shown), some or all of the components and functions of microscope control unit 60 of FIG. 2 may be incorporated into processor 88.

As previously noted, a high-definition ROI image may be created by combining hundreds or even thousands of individual field images, depending upon ROI size. Because of the various time delays associated with capturing each field image in the ROI (i.e., slide stage movement, stage settling, frame completion and (for full frame fields) refocusing), compiling a large ROI image may exceed 30 minutes in some instances. In one aspect, the invention comprises improved methods for preparing the field images to be used in a ROI image. In particular, the invention comprises methods for significantly reducing the frame completion time (FCT) associated with each field image in WSI microscopes using a digital video camera to capture images from the objective lens of the microscope, such as the digital video camera 50 in FIG. 1.

Scanning digital video cameras rapidly output (i.e., scan) video frame images as a sequence of pixel lines based on the colors reflected in the digital image sensor (DIS) pixel array. For example, a digital video camera operating at 960 columns×540 lines will output 540 lines for each frame of the video stream, with each line having 960 pixels. The result is a single video frame image of 960 columns and 540 lines, an image of about 0.5184 Mpix, When the video camera is used in a Fixed Image Acquisition (FIA) SSM, the video frame image may be captured as a field image. Similarly, a video camera operating at 1920 columns×1080 lines will output 1080 lines, a frame image of about 2 Mpix that will include more detail than the 960×540 image. For a video camera operating at 30 frames per second, the camera will output a new frame image every 33.33 mSec, based on the image sensed by the DIS. To control the output of video pixel data as lines and frames, video cameras include control logic (which may be a combination of hardware, firmware and software) to generate Line Valid (LV) and Frame Valid (FV) signals regulated by one or more clocks. The FV and LV signals are analogous to the television (CRT) signals of vertical retrace and horizontal retrace, and are used to ensure that the pixels defining a video frame image are located in the proper position.

Figure 3:
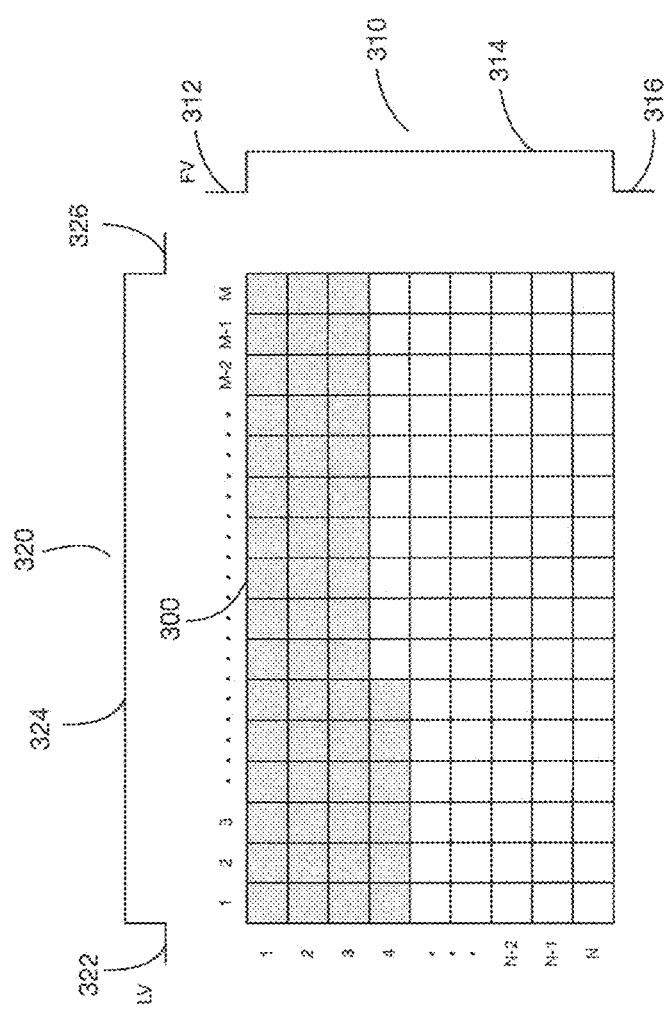
FIG. 3 is a diagram illustrating the output of a portion of a frame image 300 by a scanning video camera with a digital image sensor (DIS) operating as an M columns (pixels)×N rows (lines) pixel array.

FIG. 3 is a diagram illustrating the output of a portion of a frame image 300, and certain timing signals relating thereto, by a digital video camera (e.g., camera 50 of FIG. 1) with a digital image sensor (DIS) (e.g., CMOS digital image sensor 52), operating as an M columns (pixels)×N rows (lines) pixel array. Most digital video cameras output video data when the FV signal 310 and the LV signal 320 are both asserted. Although FIG. 3 depicts a system in which pixel data is output when the signals are asserted (or high), it will be understood that alternative embodiments in which data is output when one or both of the FV signal 310 and the LV signal 320 are de-asserted (or low) are also within the scope of the present invention.

After the pixel data for a prior video frame has been output, the FV signal 310 is de-asserted for a FV signal frame break period (approximately 1 mSec), as illustrated at portion 312 of the FV signal 310. After the FV signal frame break period 312 has elapsed, the FV signal is re-asserted, as shown at portion 314, which is necessary to enable the digital video camera to output pixel data for a new video frame 300. The FV signal 310 remains high for the duration of the output of all of the pixel data lines 1-N of the frame 300, and then is de-asserted again at portion 316, which corresponds to the FV signal frame break period for the next frame (not shown).

The LV signal 320 governs the output of each line of data, which in FIG. 3 includes M pixels of data. Before each of the M pixels in each data line of the frame 300 may be output, the LV signal must be asserted, as shown at portion 324, and remain asserted for the entire line of data. After the pixel data for a prior data line of the frame 300 has been output, the LV signal 320 is de-asserted (portion 322) for a brief LV signal line break period (approximately 1 microsecond (μSec)). After the LV signal line break period 322 has elapsed, the LV signal 320 is re-asserted (portion 324), thereby enabling the video camera to output the pixel data for the new line. The LV signal 320 remains high (portion 324) for the duration of the output of all of pixels 1-M of the new line, and then is de-asserted again at portion 326, which corresponds to the LV signal line break period for the next data line of frame 300.

As is clear from FIG. 3 and the foregoing, in a 960 pixels×540 lines array, the LV signal 320 is asserted and de-asserted 540 times before the FV signal 310 is again de-asserted (316). Thus, because the LV signal 320 is asserted and de-asserted hundreds of times for each assertion/de-assertion of the FV signal, the LV signal line break period (portions 322 and 326, for sequential lines) is an extremely transient signal break compared to the FV signal frame break period (portions 312 and 316, for sequential frames) of the FV signal 310. In many digital video camera systems, the LV signal line break duration is on the order of 1-2 μSec, compared to about 1 mSec for the FV signal break duration. Accordingly, the FV signal is hundreds or thousands of times longer than the LV signal break.

As an example, in a video camera operating at a frame rate of 30 frames/sec and having 540 lines/frame (Standard Definition mode), with a FV signal frame break period (312, 316) duration of about 1 mSec, each line of the 540 lines of the frame are output, including the LV signal line break, within about 60 μSec. In the same video camera operating at High Definition mode having 1080 lines, the entire line data output and the LV signal line break (322, 326) occurs in about 30 μSec. Because most of the line output time is necessary to complete the pixel data output, the LV signal line break is an extremely short-lived signal break.

FIG. 3 illustrates a frame in which lines 1-3 have been output, and the first six pixels of line 4 have been output (gray shading). Thus, both the LV and FV signals are asserted. If the frame output of FIG. 3 were allowed to proceed, the remainder of line 4 would be output, and the camera control module (e.g., CCM 64 in FIG. 1) would de-assert (at 326) the LV signal 320 for the LV line break period. In some embodiments, a line counter may be incremented (e.g., from 3 to 4). The LV signal would be re-asserted (portion 324) after the LV line break period, and the next line of data (line 5) in the video data would be output. The process would then be repeated until all N lines in frame 300 have been output. Once the frame is complete, the FV signal 310 would be de-asserted (portion 316) for the FV frame break period, and then reasserted (portion 314) for the next frame.

For a fixed image acquisition (FIA) slide scanning microscope, a data frame 300 from the video camera may be stored as a field image, after which a movement of the stage (X-axis or Y-axis) or objective lens (Z-axis) is made to a new position to obtain a new field image. The move may require, e.g., 4-60 mSec, depending on the axis of movement (X, Y, or Z), and a settle time must also be allowed to elapse before a new frame can be captured as a field image. In prior art systems, a fixed settle time (e.g., 160 mSec) based on a "worst-case" movement, have been used to ensure that all vibrations are completely damped out and a new, stable frame may be captured and used as a field image for the new position. During the 164-220 mSec of move time (MT) and settle time (ST), at 30 frames/sec the digital video camera may output from about 4.8 to 6.6 video frames. Because of the vibration, however, none of these video frames can be used as field images because the video frames during this period will be blurry. Thus, a number of video frames must be discarded, adding to the time required to obtain the field images for the ROI.

Figure 4:
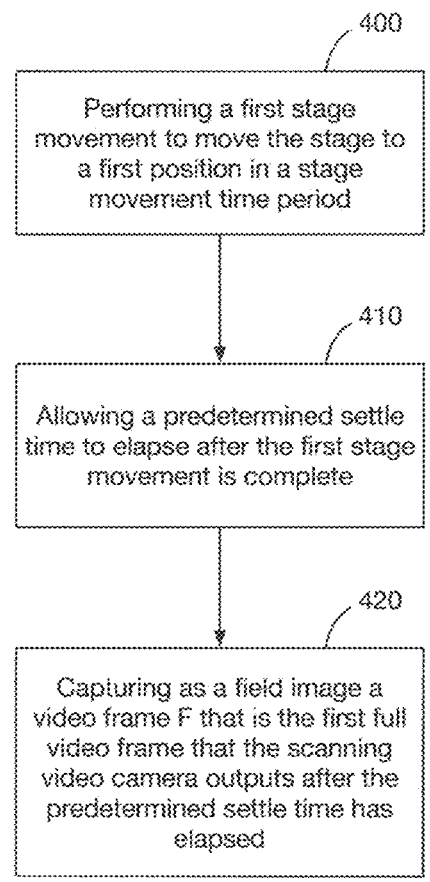
FIG. 4 is a flow chart of a prior art method for preparing a field image of a portion of a target area or ROI of a microscope slide specimen in a slide scanning microscope having a digital video camera.

FIG. 4 illustrates a flow chart of a prior art method for preparing a field image of a portion of a target area or ROI of a microscope slide specimen using a fixed image acquisition (FIA) slide scanning microscope having a digital video camera and a digital image sensor (DIS) element. The method includes performing a first slide stage movement (e.g., an X-axis, Y-axis or Z-axis movement) to move the stage to a first position at which a field image is to be taken (400). Each type of movement is characterized by a move time (MT) period, e.g., 3-40 mSec, which may be determined by the manufacturer of the SSM during the development or calibration process for each type of movement (X-axis, Y-axis, or Z-axis), and stored in a memory of the SSM for use by a clock during each movement operation to ensure good image quality. A clock may be started when the movement is initiated, and when the MT has elapsed, in some embodiments a flag or "move completed" signal may be generated. Because the movement involves significant vibration that affects images captured by the video camera, video frames 200 output during the MT period cannot be used as field images and must be discarded.

Following the completion of the first slide stage movement (e.g., as indicated by a flag or "move complete" signal from a clock), an additional settle time (ST) must also be allowed to elapse (410) before the vibrations are sufficiently damped out to produce a usable video image. The ST may be determined empirically by the slide scanning microscope manufacturer from a review of image frames taken immediately following a number of X-axis, Y-axis, and Z-axis movements. By using the known timing parameters for the digital video camera (e.g., camera data rate, frame rate, etc.), the manufacturer can determine how long after each type of movement (X, Y, or Z-axis) the frame images are too blurry or poor in quality to be used as field images. The settle time may be established based on a "worst case" ST needed to dampen out the movement having the longest post-movement vibrations (which may be the X-axis, Y-axis or Z-axis ST, depending upon the type of movement mechanism used in the microscope). The ST may be stored in a memory in the SSM. A clock is used to discard all video frame images whose output occurs in whole or in part during the predetermined ST. The clock may begin the timer after the first slide stage movement is completed (i.e., after the MT has elapsed), and provide a flag or "settle complete" signal when the ST has elapsed.

After the ST has elapsed, the next full video frame F output by the video camera is captured as the field image for the first position (420). This may be accomplished by capturing the frame following the first frame break signal output by the digital video camera following the ST completion. The process (move, settle, capture image frame) is then repeated until all field images—which may involve hundreds or thousands of field images—are captured. The images may then be combined by software to form the single, high-resolution ROI image.

The method of FIG. 4, when used in large ROI images, can result in long times to compile all of the necessary field images for combination into the ROI image. Accordingly, FIG. 5 provides a flow chart to improve upon the method of FIG. 4.

Figure 5:
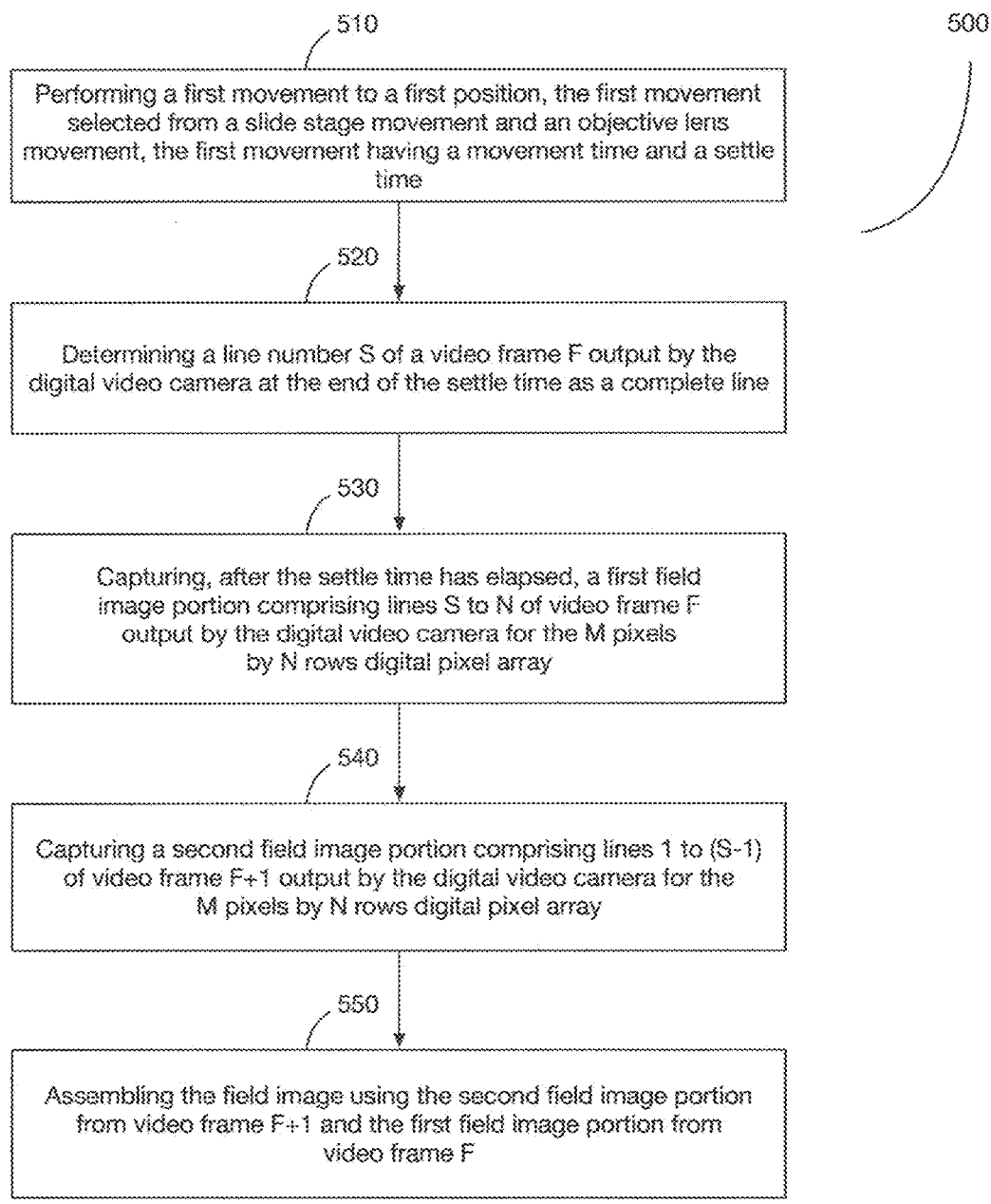
FIG. 5 illustrates a flow chart of a method for preparing a field image (or frame) of a portion of a target area or ROI of a microscope slide specimen using a slide scanning microscope.

FIG. 5 illustrates a flow chart of a method 500, according to one embodiment of the present invention, for preparing a field image of a portion of a target area or ROI of a microscope slide specimen using a fixed image acquisition (FIA) slide scanning microscope (e.g., SSM 10 of FIG. 1) having a digital video camera that is optically coupled to an objective lens and a digital image sensor (DIS) element comprising an M pixels×N rows digital pixel array. In one embodiment, the method of FIG. 5 may be executed under the control of a Microscope Control Unit 60 (FIGS. 1, 2) of the SSM. In a particular embodiment, a processor such as CPU 66 may transmit and receive instructions and data to and from one or more additional processors or controllers such as Camera Control Module (CCM) 64 or Motor Control Module (MCM) 68 which directly control the operation of the digital video camera 50 and slide stage motors 24 and Z-axis motor 54, respectively. CPU 66 may also communicate via high speed computer interface 62 with a user-controlled computer system 5 (FIG. 1) or a processor 88 within the SSM 10 (FIG. 2) that is capable of receiving user commands and controlling a display screen or monitor, similar to computer system 5.

The method of FIG. 5 includes performing a first movement, selected from a slide stage movement (X-axis, Y-axis) and an objective lens movement (Z-axis,) to a first position at which a field image is to be taken (510). In one embodiment, the slide stage movement comprises one of an X-axis and a Y-axis movement of a movable slide stage 20 (FIGS. 1, 2), the slide stage holding a microscope slide 22. In one embodiment, the focusing movement is a movement of an assembly comprising an objective lens 30, a light tube 50, and a digital video camera 50. In one embodiment, one or more slide stage motors 24, under the control of a MCM 68, are used to move the slide stage 20 to a desired position for obtaining a field image, and a Z-axis motor 54 is used to move the objective lens assembly to a desired focusing position.

Referring again to FIG. 5, each type of first movement (X-axis, Y-axis, Z-axis) is characterized by a move time (MT) and a settle time (ST), which may be used by a clock to determine when the SSM 10 is sufficiently stable to capture the field image at the first position. Because the slide stage movement or objective lens movement involves significant vibration of the video camera, video frames output during the MT or the ST periods cannot be used as field images and must be discarded.

Typically, each type of movement will have a different MT, each of which, in one embodiment, is stored in a memory of the SSM (e.g., a memory in microscope control unit 60 of FIG. 1). Each movement type will also typically have a different ST, which may also be stored, in one embodiment, in a memory of the SSM for each type of movement (X-axis, Y-axis, Z-axis). In alternative embodiments, a single "worst case" ST may be stored and used as the settle time for all movements, based on the longest ST associated with the X, Y and Z-axis moves. It will be appreciated that both the MT and ST values for each type of movement may equivalently be maintained in firmware, hardware or software (rather than stored in memory) in different embodiments without departing from the scope of the invention.

In one embodiment, the clock may be used to mark the end of the first movement by initiating a count at the start of the first movement and providing a first flag or "move complete" signal when the MT has elapsed. Similarly, in one embodiment the clock may start a ST count at the end of the MT, and provide a second flag or "settle complete" signal when the ST has elapsed. When the MT and ST have elapsed after the first slide stage movement (510), the next step in the method may be performed. In one embodiment, the clock may combine the MT and ST counts into a single, combined count and issue a single flag to indicate that both periods have elapsed. In alternative embodiments, one or more sensing elements (e.g., a position sensing element for MT and a vibration sensing element for ST) may be used to determine by direct measurement the end of one or both of the MT and ST, and the use of a clock to count off the MT, ST or both may be omitted.

The method of FIG. 5 further comprises determining a line number S of a video frame F output in its entirety by the digital video camera at the end of the ST (520). In one embodiment, line S of video frame F is determined prospectively (i.e., before the ST has elapsed) by calculation, during either the first movement move time or during the settle time. Because the total MT+ST is known for each type of movement (X-axis, Y-axis, or Z-axis), a microscope control unit (e.g., MCU 60 or CPU 66 in FIGS. 1 and 2) may determine, based on the line number of the frame being output at the start of the first movement, and the known timing parameters for the SSM (e.g., the video camera data rate, frame time (or frame rate), line output time, LV signal line break duration, FV signal frame break duration, etc.). Thus, in one embodiment, from the line number at the start of the first movement, the microscope control unit may calculate in advance how much time it will take to output the remaining lines of the current frame, the FV signal break duration, and how many additional lines and FV signal breaks will occur until the MT+ST duration is reached. Projecting the lines and signal breaks forward, the microscope control unit may determine the line number S of a first full line (in contrast to a partial line) that will be output after the ST elapses. In another embodiment, from the line number at the start of the ST (or end of the MT) the line number S of the first full (non-partial) line that will be output after the ST lapses may be determined. Accordingly, the microscope control unit may calculate, prior to its occurrence, which line number S of a frame F will be the first full line output by the digital video camera after the ST elapses. It will be appreciated that in alternative embodiments, one or more additional lines may be added to line S for a "safety factor," i.e., line S may be the $2^{nd}$, $3^{rd}$, $4^{th}$, etc. full or non-partial line output by the DVC after the ST lapses, although this is unnecessary if the MT and ST values are accurately determined.

In one embodiment, line S of video frame F may be determined in "live stream" or real time, i.e., immediately after the ST lapse occurs. This may be done using a line counter (e.g., a register) that is typically used in digital video cameras to count off the lines in a given frame. The frame line counter may involve starting a line counter at 1 after receiving a FV signal frame break (e.g., FIG. 3, at 312), and incrementing the line counter at each LV signal line break (e.g., FIG. 3, at 326) until the N lines (for an M pixels×N lines frame size) have been output by the digital video camera. Line S may be identified in real time as the line following the first LV signal line break that occurs after the ST has elapsed. For example, if line 256 is being output at the moment the ST lapse occurs, the next LV signal line break would increment the line number to line 257 and output the pixels for that line, such that line S is line 257.

As previously noted in the discussion of FIG. 4, MT and ST values may be determined by the SSM manufacturer by empirical testing. Although MT values are likely to be stable during the life of the microscope absent a major failure of the moving mechanism, ST values are more likely to change over time because of a variety of factors such as slide stage wear, motor wear, loosening of fastening elements, degradation of motion dampening structures such as rubber feet or washers, etc.). In one embodiment (see FIG. 9), the ST values determined at the time of manufacture may be stored as first ST values in the SSM as part of the calibration data (e.g., in Calibration Memory Module 72, FIG. 1).

After determining the line number S of the video frame F that will be output by the digital video camera after the ST lapses, the method further comprises capturing, after the ST has elapsed, a first field image portion comprising lines S to N of video frame F of the digital video camera having an M pixels by N rows digital image sensor (530). The first field image may be captured by storing the output of the video camera for lines S to N in a memory for retrieval and display on a display screen or monitor. In one embodiment, the memory may be a buffer memory in the high-speed computer interface or a memory in another unit or module in Microscope Control Unit 60. In another embodiment, the memory may be a memory module within the computer system 5 (FIG. 1) to which the SSM 10 is coupled. In a still further embodiment, the memory may comprise a memory module within a processor 88 (FIG. 2) that performs the functions of a computer system 5 relative to the SSM 10 such as, e.g., storing and executing a user interface program to allow a user to provide inputs and receive outputs from the SSM 10, communicating with a display monitor, etc.

After capturing the first field image portion, the method of FIG. 5 further comprises capturing a second field image portion comprising lines 1 to (S−1) of video frame F+1 of the video camera (540). Following the FV signal break separating frames F and F+1, lines 1 to (S−1) of frame F+1 output by the video camera are captured as a second field image portion, for example by storing the output of the video camera for lines 1 to (S−1) in a memory for retrieval and display on a display screen or monitor. The second field image portion may be captured by storage in, e.g., in a buffer memory in the high speed computer interface 62 or other module in MCU 60; in a memory module within the computer system 5 (FIG. 1) to which the SSM 10 is coupled; or in a memory within a processor 11 (FIG. 2) that performs the functions of a computer system 5 such as storing and executing a user interface program to allow a user to provide inputs and receive outputs from the SSM 10, communicating with a display monitor, etc.

Finally, the method of FIG. 5 comprises assembling the field image using the second image portion from video frame F+1 and the first field image portion from video frame F (550). This may be accomplished by software and/or memory in a computer system 5, CPU 66 or other structure within MCU 60 (FIG. 1), or within a processor or SBC 88 (FIG. 2) inside SSM that performs the functions of a computer system 5.

It will be appreciated that in the special case where line S=line 1 of a particular frame output by the video camera, there is no need to capture a second field image portion from a second frame, because the first image portion, which comprises lines S to N, in this case will provide a complete frame image. Software (e.g., in CPU 66 of MCU 60, FIGS. 1, 2), can direct the system to use the first image portion as a complete image.

With the exception of the foregoing special instance, the method of FIG. 5 allows the SSM to obtain a complete frame image for use as a field image from complementary portions of two sequential frames in such a way as to minimize—or eliminate entirely—the frame completion time (FCT) that would occur if the SSM waited until the beginning of the next full frame after the settle time (ST) has elapsed to capture a frame image from a single frame. As noted earlier, because the line being output by the camera in a frame F at the end of the ST will randomly vary from line 1 to line N, the time saved will average ½ of the time necessary to output one full frame. Thus, at a frame rate of 30 frames/sec (33.33 mSec/frame), approximately 16 mSec per field image can be saved. Thus, in a large ROI image comprising 2900 field images combined into a single image, the method of FIG. 5 would save approximately 46 seconds (0.016 Sec/image×2900 images) of time in obtaining the field images for the ROI.

Figure 6:
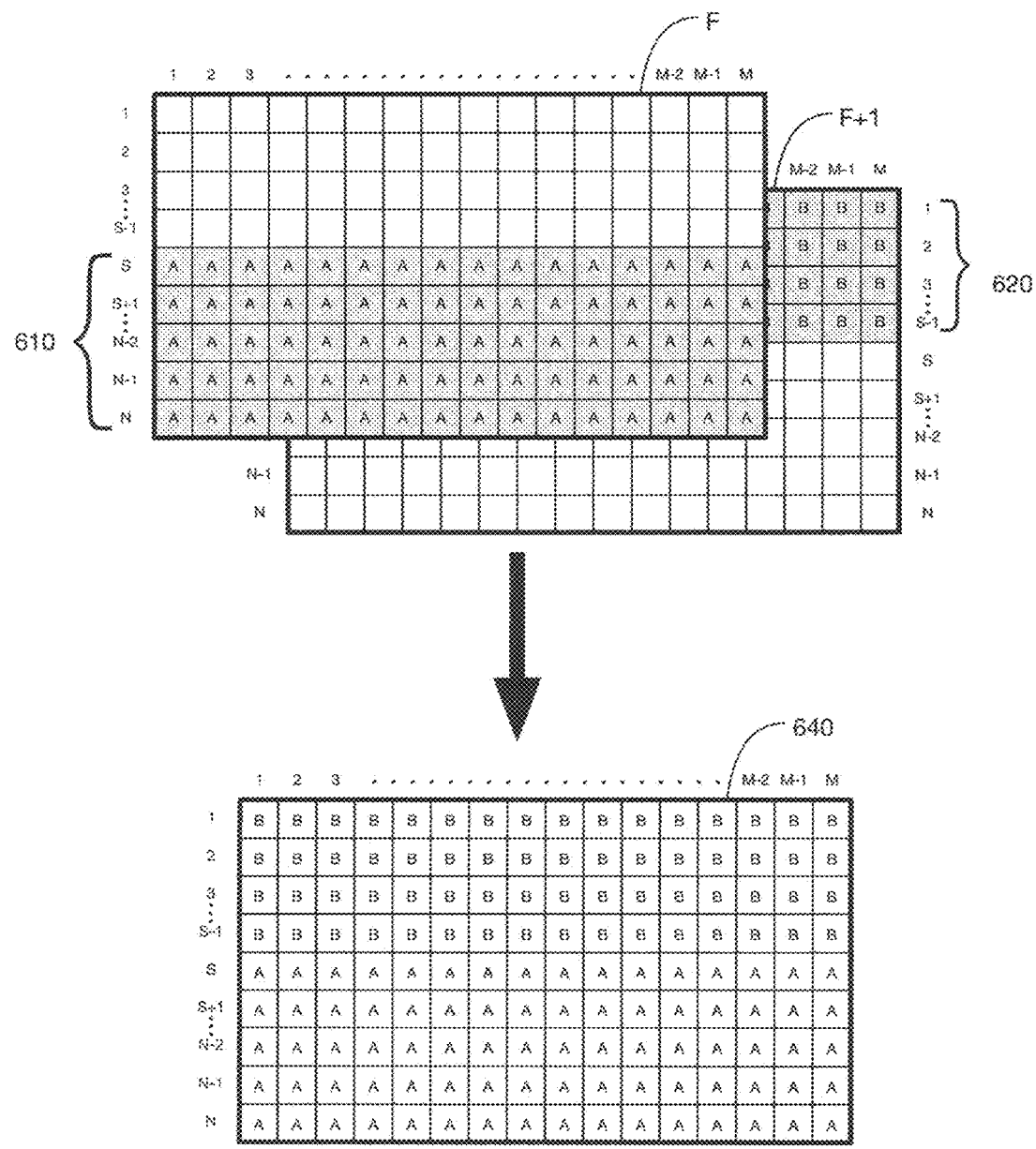
FIG. 6 is a diagram illustrating the certain aspects of the method of FIG. 5 using sequential frame images of a digital video camera.

FIG. 6 illustrates using the method of FIG. 5 to obtain a complete frame image for use as a field image in a combined ROI image from a first field image portion and a second field image portion from sequential frame images of a digital video camera in a slide scanning microscope. In the top portion of FIG. 6, a first frame F and a sequential frame F+1 are illustrated. Frame F is a frame in which a settle time following a slide stage movement ends during the output of the frame, specifically during line S−1 immediately preceding line S. A first field image portion 610, comprising lines S to N of frame F, is highlighted to indicated that they comprise complete lines of a frame F that are output entirely after the end of a settle time following a slide stage movement. A second frame F+1, which is the frame from the digital video camera immediately following frame F, includes a second field image portion 620 comprising lines 1 to (S−1) of frame F+1.

Because the first and second frame image portions together include a full frame image (i.e., all of lines 1 to N as represented by lines 1 to (S−1) of the second field image portion, and lines S to N of the first field image portion, the two images together may be assembled by software to form a complete frame image 640 which may be used as a field image for a larger ROI image. Repeating this process for all of the field image sections that together comprise the ROI will allow additional software modules to combine the images into a single ROI image.

In one aspect, the invention relates to a compact slide scanning microscope (SSM) to be coupled to a computer and a display monitor. In one embodiment, a compact SSM in this aspect of the invention comprises a polarizing light source and a polarity analyzer for analyzing the optical activity of a birefringent microscope specimen. In a particular embodiment, the compact SSM has a volume of less than 0.75 cubic feet. In another embodiment, the compact SSM has a volume of less than 0.5 cubic feet. In another embodiment, the compact SSM has a volume of less than 0.4 cubic feet. In still other embodiments, the compact SSM has a volume less than 0.3, 0.25, 0.2 and 0.15 cubic feet, respectively.

FIG. 7 is a block diagram of a slide scanning microscope (SSM) 700 suitable for analyzing the optical activity of a birefringent specimen according to one embodiment of the present invention. The SSM 700 is intended to be coupled to a computer system (e.g., computer system 5 of FIG. 1) and a monitor or display screen (e.g., monitor 7, FIGS. 1 and 2) for displaying images generated by the SSM. A variety of computer systems are suitable for use with the SSM 700, but are not discussed fully herein. In some aspects of the invention, a slide scanning microscope system may include both the SSM 700 and the computer system coupled thereto.

In an alternative embodiment discussed in connection with FIG. 8, the SSM may include an internal processor that allows the SSM to be coupled directly to a monitor and controlled by the user via an Input/Output device, without the need for an external computer. In the embodiment of FIG. 7, a computer system is coupled to the SSM 700 by a high-speed computer interface 782 within a microscope control unit 780.

The SSM 700 includes an overview camera 758 having an overview light path 747 to capture an overview image of a birefringent specimen on a microscope slide 722. Overview camera 758 is used to obtain a complete image of the specimen (not shown) on a microscope slide 722 at a low or zero magnification (e.g., 4× or less). Overview camera 758 may be a still image (snapshot) camera or a video camera used to capture a single image of the specimen. In the embodiment of FIG. 7, the overview camera 758 is a digital video camera (DVC), and includes a CMOS digital image sensor (DIS) 760. In an alternative embodiment (not shown), the overview camera 758 may use a CCD image sensor. In browse mode operation of the SSM 700, the overview image allows a user to see (e.g., by cross-hairs) where an objective lens's current field of view (FOV) is located within the overview image. In scan or zoom mode, the overview image indicates (e.g., by highlighted boxes) where the user has designated one or more target or ROI areas.

An overview illuminator 718 for overview light path 747 provides a light source to enable the CMOS DIS 760 of overview camera 758 to capture the overview image. Light from the illuminator 718 follows overview light path 747 through a movable slide stage 720 and microscope slide 722 to the CMOS DIS 760.

SSM 700 also includes two digital video cameras (DVC) 750 and 752, each comprising independent first and second imaging or objective light paths 745 and 746, respectively, for obtaining images of the birefringent specimen at first and second magnifications, respectively. First imaging light path 745 includes a first DVC 750 having a CMOS DIS 754 optically coupled to a first objective lens 730 having a first magnification. Second imaging light path 746 includes a second DVC 752 optically coupled to a second objective lens 732 having a second magnification different from the first magnification. First and second DVCs 750 and 752, and their digital image sensors 754 and 756, respectively, may be similar to DVC 50 and DIS 52 of FIGS. 1 and 2.

A first objective illuminator 712 provides a light source for viewing the specimen through first objective lens 730 via first imaging light path 745. First illuminator optics 714 may comprise a condenser, a diaphragm and one or more filters for focusing the light on the specimen. In the embodiment of FIG. 7, first illuminator optics 714 includes a first polarizer 715 which polarizes the light from first objective illuminator 712 in a plane of polarity along the optical axis of first imaging light path 745. The polarized light from first illuminator optics 714 follows first imaging light path 745 through movable slide stage 720, microscope slide 722 and the specimen, first objective lens 730, a first analyzer 770, and finally to the CMOS DIS 754 of DVC 750. In the embodiment of FIG. 7, the first polarizer 715 is in a fixed position such that the plane of polarity along the optical axis of first imaging light path 745 is fixed. In alternative embodiments (not shown) the first polarizer 715 may be rotatable (e.g., up to 360 degrees), allowing the angle of the plane of polarity of light from the first polarizer to be changed. Rotation may be accomplished, e.g., by a motor (not shown) either directly or indirectly. In one embodiment, a belt (also not shown) may be used to rotate a first polarizer 715, e.g., by making the first polarizer in a circular shape that may be rotated by frictional or toothed engagement with the belt. In some embodiments, the motor is capable of rotating the first polarizer through any desired angular rotation, i.e., without a fixed limit to the rotational range.

Referring again to FIG. 7, a first analyzer 770 includes a rotatable second polarizer 774 that, in combination with the first polarizer 715 in the illuminator optics 714, allows a user to assess the optical activity of the birefringent specimen. In one embodiment, the rotatable second polarizer 774 polarizes the light received from the birefringent specimen in a plane of polarity along the optical axis of first imaging light path 745. The rotatable second polarizer 774 is rotatable by an analyzer motor 778 through a rotational range of at least a portion of a circle, which may comprise 90 degrees, 180 degrees, 360 degrees, or more in various embodiments. In one embodiment, rotatable second polarizer 774 comprises a circular periphery allowing the polarizer to be rotated directly or indirectly by the analyzer motor 778. In one embodiment, analyzer motor 778 may be coupled to rotatable second polarizer 774 by a belt. In different embodiments, the belt and circular periphery may be smooth or toothed. In some embodiments, the analyzer motor 778 is capable of rotating the rotatable second polarizer 774 through any desired angular rotation, i.e., without a fixed limit to the rotational range. By adjusting the angle between 1) the plane of polarity of the rotatable second polarizer 774 in the first analyzer 770 and 2) the plane of polarity of first polarizer 715 in first illuminator optics 714, it is possible to identify the optical activity of the birefringent specimen on microscope slide 722. Light from the first analyzer 782 passes to the CMOS DIS 754 of first DVC 750.

In the embodiment of FIG. 7, rotatable second polarizer 774 in first analyzer 770 is rotatable, and first polarizer 715 in first illuminator optics 714 is fixed (i.e., non-rotatable). In an alternative embodiment (not shown), the rotatable second polarizer 774 may be replaced by a fixed polarizer, and first polarizer 715 may be rotatable. In a further alternative embodiment (not shown), both the rotatable second polarizer 774 and first polarizer 715 may be rotatable. When the first polarizer 715 and the rotatable second polarizer 774 are simultaneously rotated by the same angular displacement, it is possible to simulate rotating the slide specimen. In a still further alternative embodiment (not shown), both the first polarizer 715 and the first analyzer 770—including rotatable second polarizer 774—are omitted entirely.

In the embodiment of FIG. 7, there is no light tube similar to light tube 40 of FIGS. 1 and 2. A Z-axis motor 734, provided to allow adjustment of the focus of first objective lens 703, moves only the objective lens and does not move the first DVC 750. Accordingly, in the embodiment of FIG. 7, first objective lens 730 is not physically coupled to first DVC 750. The Z-axis motor 734 is used for exhaustive focus fields (EFF) to obtain a plurality of field images at different focus depths of the same slide area (i.e. microscope stage position). Small Z-axis movements between each field image are used to obtain the plurality of EFF images having different focus depths, which is commonly referred to as a Z-stack. Z-axis movements are associated with a Z-axis move time and a Z-axis settle time.

Movable slide stage 720 comprises a generally planar platform that is movable in X and Y directions in the plane of the platform, and includes retainers (not shown), for securely holding the microscope slide 722 in position. In some embodiments, the movable slide stage 720 may include a recessed area for receiving the microscope slide 22 and to assist in maintaining it in position.

One or more slide stage motors 725 are coupled to the movable slide stage 720 and are capable of moving the slide stage 720 and slide 722 rapidly in small increments or steps to a series of stationary positions from which field images may be taken by the first digital video camera 750. In one embodiment, separate motors 725 are provided for X-axis and Y-axis movements of the movable slide stage 20. In another embodiment, a single motor is provided for both X-axis and Y-axis movements. As previously discussed, X-axis and Y-axis movements are each associated with a move time and a settle time. Slide stage motors 725 may be similar to slide stage motors 24 of FIG. 1, previously described, and are capable of moving the slide stage 720 and slide 722 rapidly to a series of positions from which field images may be taken by DVC 750.

First objective lens 730 is provided in first imaging light path 745 to magnify the birefringent specimen to a desired magnification. First objective lens 730 may have any of a variety of desired magnifications, e.g. 4×, 10×, 20×, 40×, 60×, 100×, etc. First objective lens 730 is similar to objective lens 30 (FIG. 1), previously described. In some embodiments, first objective lens 730 may be specifically designed for polarized light observation (e.g., designated by P, PO or Pol on the barrel of the first objective lens 730). Objective lenses 730 may have a numerical aperture in the range of about 0.1 to about 1.25, may be finite or infinity-focused, and may provide a variety of optical corrections for, e.g., chromatic and spherical aberrations, etc.

Without repeating the discussion of the components of first imaging light path 745, similar components are provided for the second imaging light path 746, which in the embodiment of FIG. 7 allows images to be obtained of the birefringent specimen at a different magnification from that of first imaging light path 745. Briefly, second imaging light path 746 includes a second objective illuminator 713 that provides a light source for viewing the birefringent specimen through second objective lens 732. Second illuminator optics 716, may comprise a condenser, a diaphragm and one or more filters for focusing the light on the specimen. Second illuminator optics also includes a third polarizer 717 that polarizes the light from the second objective illuminator 713. Polarized light from second illuminator optics 716 follows second imaging light path 746 through the movable slide stage 720, microscope slide 722 and the birefringent specimen, second objective lens 732, a second analyzer 772 having a rotatable fourth polarizer 776, and finally to a CMOS DIS 756 of second digital video camera 752.

Second analyzer 772 and rotatable fourth polarizer 776 are similar to first analyzer 770 and rotatable second analyzer 774 in the embodiment of FIG. 7, although as noted previously in connection with rotatable second analyzer 774, in an alternative embodiment the rotatable fourth polarizer 776 may be replaced with a fixed polarizer (not shown), and third polarizer 717 may be rotatable. In a further alternative embodiment (not shown), one of the first light path 745 and the second light path 746 is a brightfield light path or a darkfield light path that does not include a polarizer or an analyzer. In one such embodiment, the first polarizer 715, first analyzer 770, and rotatable second analyzer 774 are omitted. In another such embodiment, the third polarizer 717, second analyzer 772, and rotatable fourth polarizer 776 are omitted.

Hardware components of the slide scanning microscope 700 are electrically controlled by a microscope control unit (MCU) 780, which may be similar to MCU 60 of FIGS. 1 and 2 in different embodiments. MCU 780 may comprise hardware, software and/or firmware in a variety of configurations to accomplish the microscope tasks and operations discussed herein, and such configurations are deemed to be within the scope of the invention except as specifically excluded by the claims.

SSM 700 also includes a case 710 within which substantially all of the foregoing except a computer system 705 and/or monitor and user I/O device are housed. Thus, case 90 provides a protective enclosure for the moveable slide stage 20, motors 725, 734 and 778, overview camera 758 and DVCs 750 and 752, objective lenses 730 and 732, illuminators 712 and 713, illuminator optics 714 and 716 (including first and third polarizers 715 and 717), analyzers 770 and 772 (including rotatable second and fourth polarizers 774 and 776), and microscope control unit 780.

In the embodiment of FIG. 7, SSM 700 provides a compact slide scanning microscope for analyzing the optical activity of a birefringent specimen. A user of the SSM 700 may provide commands from an external computer system 705 to the microscope control unit 60 of the SSM via a high-speed computer interface 62. In one embodiment, external computer system 705 includes a SSM control unit 708 in a computer 706, and a monitor or display 707. In one embodiment, SSM control unit 708 includes a graphical user interface (GUI) for display on monitor 707. The SSM control unit 708 of computer system 5 may comprise one or more of hardware, firmware and software to enable the user to exchange commands and data with the SSM 700.

FIG. 8 is a block diagram of another embodiment of a slide scanning microscope (SSM) 800 suitable for analyzing the optical activity of a birefringent specimen. SSM 800, like SSM 700 of FIG. 7, includes three independent light paths, two of which each include a polarizer and an analyzer. Unlike SSM 700, however SSM 800 includes a processor 888 that allows the SSM to be directly coupled to a monitor 807 without an external computer. The user may control the operation of the SSM using only a user input/output device 809. In some aspects of the invention, a slide scanning microscope system may include the SSM 800 (including processor 888) as well as the I/O device and monitor 807.

Without repeating the full discussion of FIG. 7, SSM 800 includes a moveable slide stage 820 for holding a microscope slide 822 having a specimen thereon. One or more slide stage motors 825 are used to move the slide stage to desired positions from which images may be acquired. Overview images at low or zero magnification may be obtained from an overview light path 847 which includes an overview illuminator 818 and an overview camera 858 having a CMOS digital image sensor 860.

SSM 800 includes two objective light paths 845 and 846 through which magnified images may be acquired. In a first objective light path 845, a first objective illuminator 812 includes a light source for viewing the specimen through a first objective lens 832. First illuminator optics 814 are provided to direct the light from the first objective illuminator onto the slide 822 and to first objective lens 832. A first polarizer 815 included in first illuminator optics 814 polarizes the light from the first objective illuminator 812 in a plane of polarity along the optical axis of first imaging light path 845. The polarized light then follows first imaging light path 845 through the movable slide stage 820, microscope slide 822 and the specimen, first objective lens 832, a first analyzer 870, and finally to the CMOS digital image sensor 854 of digital video camera 850. First polarizer 815 is in a fixed position in the embodiment of FIG. 8, but may be rotatable in other embodiments (not shown) up to a desired angle (e.g., up to 360 degrees or more) as previously discussed in connection with FIG. 7.

In the embodiment of FIG. 8, first analyzer 870 includes a rotatable second polarizer 874. In combination with first polarizer 815, the second rotatable polarizer allows a user to assess the optical activity of a birefringent specimen. In one embodiment, the rotatable second polarizer 874 is rotatable by an analyzer motor 878 through a rotational range of at least a portion of a circle, e.g., 90, 180 or 360 degrees or more. Because the polarizer is rotatable, the plane of polarity of the second polarizer may be changed to a desired degree of alignment with the plane of polarity of the first polarizer 815, which allows the user to assess the optical activity of a birefringent specimen. In one embodiment, rotatable second polarizer 874 includes a circular periphery allowing it to be rotated by direct or indirect engagement with the analyzer motor 878. In one embodiment, analyzer motor 878 may indirectly drive the rotatable second polarizer 874 by a belt coupling the motor 878 and the rotatable second polarizer 874. The belt may be toothed or smooth in various embodiments. In some embodiments, the analyzer motor 878 is capable of rotating the rotatable second polarizer through any desired angular rotation, i.e., without a fixed limit to the rotational range.

In the embodiment of FIG. 8, rotatable second polarizer 874 in first analyzer 870 is rotatable, and first polarizer 815 is fixed (i.e., non-rotatable). In an alternative embodiment (not shown), the rotatable second polarizer 874 may be fixed, and first polarizer 815 may be rotatable. In a further alternative embodiment (not shown), both the rotatable second polarizer 874 and first polarizer 815 may be rotatable. In a still further alternative embodiment (not shown), first polarizer 815 and first analyzer 870—including second polarizer 874—may be omitted entirely.

In the embodiment of FIG. 7, there is no light tube coupling the first objective lens 830 to the digital video camera 850. A Z-axis motor 834 is provided to move the objective lens 830 to adjust its focus, but the Z-axis motor 834 moves only the first objective lens 830 and does not move the first digital video camera 850. The Z-axis motor 734 is used in exhaustive focus fields (EFF) to obtain a plurality of field images at different focus depths of the same slide area (i.e., microscope stage position). Small Z-axis movements between each field image of the Z-stack are used to obtain the plurality of EFF (Z-stack) images having different focus depths. Z-axis movements are associated with a Z-axis move time and a Z-axis settle time.

Movable slide stage 820 comprises a generally planar platform movable in X and Y directions in the plane of the platform. In one embodiment, separate X-axis and Y-axis motors, designated generally as 825, move the slide stage 820 in the X-axis and Y-axis directions. The movable slide stage 820 may include retainers (not shown) to hold the slide 822 in position, and may also include a recessed area (not shown) to further assist in holding the slide in position on the stage 820. Additional details of the slide, objective lens 830 are provided in the discussion of FIG. 7.

Without repeating the discussion of the components of the first imaging light path 845, a second imaging light path 846 includes similar components to those of first imaging light path 845. Briefly, second imaging light path 846 includes a second objective illuminator 813 having a light source for viewing a birefringent specimen through second objective lens 832. Second illuminator optics 816 may comprise a condenser, diaphragm and one or more filters for directing the light on the specimen. Second illuminator optics 816 further includes a third polarizer 817 that polarizes the light from the second objective illuminator. Polarized light from second illuminator optics 816 follows second imaging light path 846 through the movable slide stage 820, microscope slide 822, and the birefringent specimen, through second objective lens 832, a second analyzer 872 having a rotatable fourth polarizer 876, and finally to CMOS digital image sensor 856 of second digital video camera 852.

Second analyzer 872 and rotatable fourth polarizer 876 are similar to first analyzer 870 and rotatable second analyzer 874. However, in alternative embodiments rotatable fourth polarizer 876 may be fixed, and third polarizer (fixed in the embodiment of FIG. 8), may be rotatable. In a still further alternative embodiment, both the third polarizer 8172 and the second analyzer 872 (including the rotatable fourth polarizer 76) are omitted.

Hardware components of the slide scanning microscope 700 are electrically controlled by a microscope control unit (MCU) 880, which may be similar to MCU 60 of FIGS. 1, 2 and 7 in different embodiments. MCU 880 may comprise hardware, software and/or firmware in a variety of configurations, all of which are deemed to be within the scope of the invention except as specifically excluded by the claims.

SSM 800 includes a processor 888 that allows the SSM to be coupled directly to a monitor or display 807 (e.g., via an HDMI connector coupled to processor 888) without an external computer. In one embodiment, processor 888 may comprise an operating system that allows the processor to function as a "computer system on a chip," or a single-board computer (SBC) for controlling the SSM 888. To this end, processor 888 comprises a SSM control unit (not shown), similar to SSM control unit 708 of external computer 706 of FIG. 7, that may receive inputs from the user I/O device 809 to control the function of the SSM 800. The SSM control unit of processor 888 may include a GUI for display on monitor 807, and includes firmware or software to enable a user to operate the SSM 800 with input/output (I/O) device 809. User I/O device 809 may comprise, as nonlimiting examples in various embodiments, a keyboard, a mouse, or a touchscreen (which may be a touchscreen on monitor 807). In some embodiments (not shown), user I/O device 809 may be provided on an exterior surface of a case 810, e.g., as a touchscreen, touchpad, or buttons.

A user of the SSM 800 may provide signals to processor 888 using I/O device 809 to generate one or more commands that are passed to the microscope control unit 880 of the SSM via a high-speed computer interface 882, e.g., to move the slide stage 820 to a new position and acquire a field image using the first or second digital video cameras 850, 852 after the move. In the embodiment of FIG. 8, microscope control unit 880 of SSM 800 includes the same units/modules as described for SSM 10 of FIG. 1. In some embodiments (not shown), some or all of the components and functions of microscope control unit 880 may be incorporated into processor 888.

SSM 800 includes a case 810 within which substantially of the foregoing except the monitor 807 and user Input/Output device 809 are housed. Case 810 thus provides a protective enclosure for the moveable slide stage 820, motors 825, 834 and 878, overview camera 858 and DVCs 850 and 852, objective lenses 830 and 832, illuminators 812 and 813, illuminator optics 814 and 816 (including first and third polarizers 815 and 817), analyzers 870 and 872 (including rotatable second and fourth polarizers 874 and 876), microscope control unit 880, and processor 888.

In various embodiments, the present invention relates to the subject matter of the following numbered paragraphs.

100. A slide scanning microscope system for preparing an image of a target area of a microscope slide specimen from a plurality of field images captured from a series of stationary slide stage positions using a digital video camera, each field image comprising an image of a portion of the target area of the slide specimen, the slide scanning microscope system comprising:

a slide scanning microscope comprising:

a movable slide stage for holding a microscope slide having a specimen thereon;

at least one slide stage motor capable performing a slide stage movement to move the movable slide stage to a desired stationary slide stage position, the slide stage movement having a settle time;

at least one objective lens for magnifying light received from the specimen;

at least one objective lens motor, wherein each of the at least one objective lens motors is coupled to one of the at least one objective lenses, each of the at least one objective lens motors being capable of performing an objective lens movement to move the objective lens coupled to the motor to a desired stationary objective lens position, the objective lens movement having a settle time;

at least one illuminator, wherein each of the at least one illuminators is optically coupled to one of the at least one objective lenses and includes a light source to illuminate the specimen;

at least one digital video camera, wherein each of the at least one digital video cameras is optically coupled to one of the at least one objective lenses, each of the at least one digital video cameras having a digital image sensor operating as an M pixels by N lines digital pixel array and outputting video images as a series of frames, each frame comprising N lines each having M pixels of data; and a microscope control unit comprising:

a high-speed computer interface for transmitting data and commands between a computer system and the slide scanning microscope; and a CPU for determining, in response to a slide stage movement or an objective lens movement, a line number S of a video frame F output by the digital video camera at the end of the settle time as a complete line; and a computer system comprising:

a slide scanning microscope control unit, the SSM control unit being capable of:

assembling a plurality of field images, each field image assembled in response to a slide stage movement or an objective lens movement by:

receiving from the digital video camera via the high-speed computer interface a first field image portion comprising lines S to N of a video frame F output by the digital video camera;

receiving from the digital video camera via the high-speed computer interface a second field image portion comprising lines 1 to (S−1) of a video frame F+1 output by the digital video camera; and assembling the field image from the first field image portion and the second field image portion; and assembling the plurality of field images to form a single image of the target area; and a monitor for displaying at least a portion of said single image of the target area.

101. The slide scanning microscope system of claim 100, wherein said at least one slide stage motor comprises an X-axis motor capable of moving the movable slide stage in an X-axis direction, and a Y-axis motor capable of moving the movable stage in a Y-axis direction perpendicular to the X-axis direction.

102. The slide scanning microscope system of claim 101, wherein the X-axis motor, the Y-axis motor, and the at least one objective lens motor are stepper motors.

103. The slide scanning microscope system of claim 101, wherein the slide scanning microscope further comprises:

a first polarizer optically coupled to one of the at least one objective lenses, the first polarizer located between the illuminator optically coupled to said one of the at least one objective lenses and the movable slide stage;

an analyzer optically coupled to said one of the at least one objective lenses, the analyzer comprising a rotatable second polarizer, wherein the analyzer is located between said one of the at least one objective lenses and the digital video camera optically coupled to said one of the at least one objective lenses; and an analyzer motor mechanically coupled to the rotatable second polarizer and capable of rotating the rotatable second polarizer through a rotational range of at least 90 degrees.

104. The slide scanning microscope system of claim 103, further comprising:

a belt mechanically coupling the analyzer motor and the rotatable second polarizer, wherein the motor and belt are capable of rotating the rotatable second polarizer through a rotational range of at least 90 degrees.

105. The slide scanning microscope system of claim 104, wherein the slide scanning microscope comprises:
   at least two illuminators;
   at least two first polarizers;
   at least two objective lenses;
   at least two objective lens motors, each of said at least two objective lens motors being mechanically coupled to one of the at least two objective lenses;
   at least two analyzers, each of said at least two analyzers having a rotatable second polarizer;
   at least two analyzer motors, each of said at least two analyzer motors being mechanically coupled to a rotatable second polarizer of one of the at least two analyzers; and
   at least two digital video cameras.

106. The slide scanning microscope system of claim 105, wherein the slide scanning microscope comprises at least a first optical path and a second optical path, where each of said first and second optical paths comprise one of said at least two illuminators, the first polarizer, the at least two objective lenses, one of said at least two analyzers, and one of said at least two digital video cameras.

107. The slide scanning microscope system of claim 103, the slide scanning microscope further comprising
   at least two illuminators;
   at least two objective lenses;
   at least two objective lens motors;
   at least two digital video cameras, each of the at least two digital video cameras optically coupled to one of the at least two objective lenses, and
   a case that houses the movable slide stage, the X-axis motor, the Y-axis motor, the at least two illuminators, the at least two objective lenses, the at least two objective lens motors, the at least two digital video cameras, the microscope control unit, the first polarizer, the analyzer, and the analyzer motor.

108. The slide scanning microscope of claim 107, wherein the case comprises a volume of 0.75 cubic feet or less.

109. The slide scanning microscope of claim 107, wherein the case comprises a volume of 0.5 cubic feet or less.

110. The slide scanning microscope of claim 107, wherein the case comprises a volume of 0.4 cubic feet or less.

111. The slide scanning microscope of claim 107, wherein the case comprises a volume of 0.3 cubic feet or less.

112. The slide scanning microscope of claim 100, wherein the microscope control unit further comprises:
   a camera control module for controlling the operation of the overview camera and each of the at least one digital video cameras;
   a motor control module for controlling the operation of each of the at least one slide stage motors and each of the at least one objective lens motors; and
   an illuminator control module for controlling the operation of the light source.

113. The slide scanning microscope system of claim 100, further comprising an overview camera for capturing an overview image of the specimen;

200. A compact slide scanning microscope for capturing images of a microscope slide specimen and transmitting the images to a computer for display, the compact slide scanning microscope comprising:
   a) a movable slide stage for holding a microscope slide having a specimen thereon, wherein the slide stage is movable in a plane in an X-axis direction and a Y-axis direction perpendicular to the X-axis direction;
   b) an X-axis slide stage motor capable of moving the movable slide stage in the X-axis direction;
   c) a Y-axis slide stage motor capable of moving the movable slide stage in the Y-axis direction;
   d) an overview camera for capturing an overview image of the specimen;
   e) a first imaging light path for capturing an image of the microscope slide specimen, the first imaging light path comprising:
      1) a first illuminator comprising a light source for illuminating the slide specimen;
      2) first illuminator optics for regulating the light from the first illuminator
      3) a first objective lens, optically coupled to the first illuminator, for magnifying light received from the specimen at a first magnification;
      4) a first digital video camera optically coupled to the first objective lens, the first digital video camera having a CMOS digital image sensor operating as an M pixels by N lines digital pixel array and outputting video images as a series of frames, each frame comprising N lines each having M pixels of data;
   f) a first objective lens motor mechanically coupled to the first objective lens, the first objective lens motor being capable of performing an objective lens movement to move the first objective lens to a desired stationary objective lens position;
   g) a second imaging light path for capturing an image of the microscope slide specimen, the second imaging light path comprising:
      1) a second illuminator comprising a light source for illuminating the slide specimen;
      2) second illuminator optics for regulating the light from the second illuminator
      3) a second objective lens, optically coupled to the second illuminator, for magnifying light received from the specimen at a second magnification;
      4) a second digital video camera optically coupled to the second objective lens, the second digital video camera having a CMOS digital image sensor operating as an M pixels by N lines digital pixel array and outputting video images as a series of frames, each frame comprising N lines each having M pixels of data;
   h) a second objective lens motor mechanically coupled to the second objective lens, the second objective lens motor being capable of performing an objective lens movement to move the second objective lens to a desired stationary objective lens position;
   i) a microscope control unit comprising:
      1) high-speed computer interface for transmitting data and commands between a computer system and the slide scanning microscope; and
      2) a processor; and
   j) a case comprising a housing for the movable slide stage, the X-axis and Y-axis slide stage motors, the overview camera, the first and second illuminators, the first and second illuminator optics, the first and second objective lenses, the first and second digital video cameras, the first and second objective lens motors, and the microscope control unit, wherein the case comprises a volume of no more than 0.4 cubic feet.

201. The slide scanning microscope of claim 200, wherein said first imaging light path further comprises:

5) a first polarizer optically coupled to the first objective lens, the first polarizer located between the first illuminator and the movable slide stage, and
6) a first analyzer optically coupled to the first objective lens, the first analyzer comprising a rotatable second polarizer, wherein the analyzer is located between the first objective lens and the first digital video camera, the compact slide scanning microscope further comprising k) a first analyzer motor mechanically coupled to the rotatable second polarizer and capable of rotating the rotatable second polarizer through a rotational range of at least 90 degrees.

300. A compact slide scanning microscope system capturing images of a microscope slide specimen and transmitting the images to a monitor for display, the compact slide scanning microscope comprising:

a) a movable slide stage for holding a microscope slide having a specimen thereon, wherein the slide stage is movable in a plane in an X-axis direction and a Y-axis direction perpendicular to the X-axis direction;

b) an X-axis slide stage motor capable of moving the movable slide stage in the X-axis direction;

c) a Y-axis slide stage motor capable of moving the movable slide stage in the Y-axis direction;

d) an overview camera for capturing an overview image of the specimen;

e) a first imaging light path for capturing an image of the microscope slide specimen, the first imaging light path comprising:

1) a first illuminator comprising a light source for illuminating the slide specimen;
2) first illuminator optics for regulating the light from the first illuminator
3) a first objective lens, optically coupled to the first illuminator, for magnifying light received from the specimen at a first magnification;
4) a first digital video camera optically coupled to the first objective lens, the first digital video camera having a CMOS digital image sensor operating as an M pixels by N lines digital pixel array and outputting video images as a series of frames, each frame comprising N lines each having M pixels of data;

f) a first objective lens motor mechanically coupled to the first objective lens, the first objective lens motor being capable of performing an objective lens movement to move the first objective lens to a desired stationary objective lens position;

g) a second imaging light path for capturing an image of the microscope slide specimen, the second imaging light path comprising:

1) a second illuminator comprising a light source for illuminating the slide specimen;
2) second illuminator optics for regulating the light from the second illuminator
3) a second objective lens, optically coupled to the second illuminator, for magnifying light received from the specimen at a second magnification;
4) a second digital video camera optically coupled to the second objective lens, the second digital video camera having a CMOS digital image sensor operating as an M pixels by N lines digital pixel array and outputting video images as a series of frames, each frame comprising N lines each having M pixels of data;

h) a second objective lens motor mechanically coupled to the second objective lens, the second objective lens motor being capable of performing an objective lens movement to move the second objective lens to a desired stationary objective lens position;

i) a microscope control unit comprising:
1) a high-speed computer interface for exchanging data and commands with a single board computer; and
2) a processor;

j) a single board computer comprising a slide scanning microscope control unit, the slide scanning microscope control unit being capable of receiving images or image portions from the first digital video camera and the second digital video camera via the high-speed computer interface;

k) a case comprising a housing for the movable slide stage, the X-axis and Y-axis slide stage motors, the overview camera, the first and second illuminators, the first and second illuminator optics, the first and second objective lenses, the first and second digital video cameras, the first and second objective lens motors, the microscope control unit, and the single board computer, wherein the case comprises a volume of no more than 0.4 cubic feet;

l) a monitor capable of displaying images received from the single board computer; and m) a user input/output device.

400. A slide scanning microscope system for capturing and displaying images of a microscope slide specimen, comprising:

a) a movable slide stage for holding a microscope slide having a specimen thereon, wherein the slide stage is movable in a plane in an X-axis direction and a Y-axis direction perpendicular to the X-axis direction;

b) an X-axis slide stage motor capable of moving the movable slide stage in the X-axis direction;

c) a Y-axis slide stage motor capable of moving the movable slide stage in the Y-axis direction;

d) an overview camera for capturing an overview image of the specimen;

e) a first imaging light path for capturing an image of the microscope slide specimen, the first imaging light path comprising:

1) a first illuminator comprising a light source for illuminating the slide specimen;
2) first illuminator optics for regulating the light from the first illuminator
3) a first objective lens, optically coupled to the first illuminator, for magnifying light received from the specimen at a first magnification;
4) a first digital video camera optically coupled to the first objective lens, the first digital video camera having a CMOS digital image sensor operating as an M pixels by N lines digital pixel array and outputting video images as a series of frames, each frame comprising N lines each having M pixels of data;

f) a first objective lens motor mechanically coupled to the first objective lens, the first objective lens motor being capable of performing an objective lens movement to move the first objective lens to a desired stationary objective lens position;

g) a second imaging light path for capturing an image of the microscope slide specimen, the second imaging light path comprising:

1) a second illuminator comprising a light source for illuminating the slide specimen;
2) second illuminator optics for regulating the light from the second illuminator
3) a second objective lens, optically coupled to the second illuminator, for magnifying light received from the specimen at a second magnification;

4) a second digital video camera optically coupled to the second objective lens, the second digital video camera having a CMOS digital image sensor operating as an M pixels by N lines digital pixel array and outputting video images as a series of frames, each frame comprising N lines each having M pixels of data;

h) a second objective lens motor mechanically coupled to the second objective lens, the second objective lens motor being capable of performing an objective lens movement to move the second objective lens to a desired stationary objective lens position;

i) a microscope control unit comprising:
1) a high-speed computer interface for transmitting data and commands between a computer system and the slide scanning microscope; and
2) a processor;

j) a case comprising a housing for the movable slide stage, the X-axis and Y-axis slide stage motors, the overview camera, the first and second illuminators, the first and second illuminator optics, the first and second objective lenses, the first and second digital video cameras, the first and second objective lens motors, and the microscope control unit, wherein the case comprises a volume of no more than 0.4 cubic feet; and k) a computer system comprising:
1) a slide scanning microscope control unit, the slide scanning microscope control unit being capable of transmitting and receiving commands and data with the microscope control unit; and
2) a monitor capable of displaying images received from the first digital video camera and the second digital video camera.

500. A compact slide scanning microscope for capturing images of a birefringent microscope slide specimen and transmitting the images to a computer for display, the compact slide scanning microscope comprising:

a) a movable slide stage for holding a microscope slide having a specimen thereon, wherein the slide stage is movable in a plane in an X-axis direction and a Y-axis direction perpendicular to the X-axis direction;

b) an X-axis slide stage motor capable of moving the movable slide stage in the X-axis direction;

c) a Y-axis slide stage motor capable of moving the movable slide stage in the Y-axis direction;

d) an overview camera for capturing an overview image of the specimen;

e) a first imaging light path for capturing an image of the microscope slide specimen, the first imaging light path comprising:
1) a first illuminator comprising a light source for illuminating the slide specimen;
2) first illuminator optics for regulating the light from the first illuminator
3) a first objective lens, optically coupled to the first illuminator, for magnifying light received from the specimen at a first magnification;
4) a first digital video camera optically coupled to the first objective lens, the first digital video camera having a CMOS digital image sensor operating as an M pixels by N lines digital pixel array and outputting video images as a series of frames, each frame comprising N lines each having M pixels of data;
5) a first polarizer optically coupled to the first objective lens, the first polarizer located between the first illuminator and the movable slide stage, and
6) a first analyzer optically coupled to the first objective lens, the first analyzer comprising a rotatable second polarizer, wherein the analyzer is located between the first objective lens and the first digital video camera f) a first objective lens motor mechanically coupled to the first objective lens, the first objective lens motor being capable of performing an objective lens movement to move the first objective lens to a desired stationary objective lens position;

g) a first analyzer motor mechanically coupled to the rotatable second polarizer and capable of rotating the rotatable second polarizer through a rotational range of at least 90 degrees;

h) a second imaging light path for capturing an image of the microscope slide specimen, the second imaging light path comprising:
1) a second illuminator comprising a light source for illuminating the slide specimen;
2) second illuminator optics for regulating the light from the second illuminator
3) a second objective lens, optically coupled to the second illuminator, for magnifying light received from the specimen at a second magnification;
4) a second digital video camera optically coupled to the second objective lens, the second digital video camera having a CMOS digital image sensor operating as an M pixels by N lines digital pixel array and outputting video images as a series of frames, each frame comprising N lines each having M pixels of data;
5) a third polarizer optically coupled to the second objective lens, the third polarizer located between the second illuminator and the movable slide stage, and
6) a second analyzer optically coupled to the second objective lens, the second analyzer comprising a rotatable fourth polarizer, wherein the second analyzer is located between the second objective lens and the second digital video camera;

i) a second objective lens motor mechanically coupled to the second objective lens, the second objective lens motor being capable of performing an objective lens movement to move the second objective lens to a desired stationary objective lens position;

j) a second analyzer motor mechanically coupled to the rotatable fourth polarizer and capable of rotating the rotatable fourth polarizer through a rotational range of at least 90 degrees;

k) a microscope control unit comprising:
a high-speed computer interface for transmitting data and commands between a computer system and the slide scanning microscope; and
a processor; and l) a case comprising a housing for the movable slide stage, the X-axis and Y-axis slide stage motors, the overview camera, the first and second illuminators, the first and second illuminator optics, the first and second objective lenses, the first and second digital video cameras, the first and second objective lens motors, the first and second analyzer motors, and the microscope control unit, wherein the case comprises a volume of no more than 0.4 cubic feet.

501. The slide scanning microscope system of claim 500, further comprising:

a belt mechanically coupling at least one of the first analyzer motor and the rotatable second polarizer, and the second analyzer motor and the fourth rotatable polarizer, wherein the belt is capable of rotating the at least one of the rotatable second polarizer and the rotatable fourth polarizer through a rotational range of at least 360 degrees.

600. A compact slide scanning microscope for capturing images of a birefringent microscope slide specimen and transmitting the images to a computer for display, the compact slide scanning microscope comprising:

a) a movable slide stage for holding a microscope slide having a specimen thereon, wherein the slide stage is movable in a plane in an X-axis direction and a Y-axis direction perpendicular to the X-axis direction;

b) an X-axis slide stage motor capable of moving the movable slide stage in the X-axis direction;

c) a Y-axis slide stage motor capable of moving the movable slide stage in the Y-axis direction;

d) an overview camera for capturing an overview image of the specimen;

e) a first imaging light path for capturing an image of the microscope slide specimen, the first imaging light path comprising:
  1) a first illuminator comprising a light source for illuminating the slide specimen;
  2) first illuminator optics for regulating the light from the first illuminator
  3) a first objective lens, optically coupled to the first illuminator, for magnifying light received from the specimen at a first magnification;
  4) a first digital video camera optically coupled to the first objective lens, the first digital video camera having a CMOS digital image sensor operating as an M pixels by N lines digital pixel array and outputting video images as a series of frames, each frame comprising N lines each having M pixels of data;
  5) a first polarizer optically coupled to the first objective lens, the first polarizer located between the first illuminator and the movable slide stage, and
  6) a first analyzer optically coupled to the first objective lens, the first analyzer comprising a rotatable second polarizer, wherein the analyzer is located between the first objective lens and the first digital video camera f) a first objective lens motor mechanically coupled to the first objective lens, the first objective lens motor being capable of performing an objective lens movement to move the first objective lens to a desired stationary objective lens position;

g) a first analyzer motor mechanically coupled to the rotatable second polarizer and capable of rotating the rotatable second polarizer through a rotational range of at least 90 degrees;

h) a second imaging light path for capturing an image of the microscope slide specimen, the second imaging light path comprising:
  1) a second illuminator comprising a light source for illuminating the slide specimen;
  2) second illuminator optics for regulating the light from the second illuminator
  3) a second objective lens, optically coupled to the second illuminator, for magnifying light received from the specimen at a second magnification;
  4) a second digital video camera optically coupled to the second objective lens, the second digital video camera having a CMOS digital image sensor operating as an M pixels by N lines digital pixel array and outputting video images as a series of frames, each frame comprising N lines each having M pixels of data;

i) a second objective lens motor mechanically coupled to the second objective lens, the second objective lens motor being capable of performing an objective lens movement to move the second objective lens to a desired stationary objective lens position;

j) a microscope control unit comprising:
  1) a high-speed computer interface for transmitting data and commands between a computer system and the slide scanning microscope; and
  2) a processor; and k) a case comprising a housing for the movable slide stage, the X-axis and Y-axis slide stage motors, the overview camera, the first and second illuminators, the first and second illuminator optics, the first and second objective lenses, the first and second digital video cameras, the first and second objective lens motors, the first polarizer, the first analyzer, the first analyzer motor, and the microscope control unit, wherein the case comprises a volume of no more than 0.4 cubic feet.

601. The slide scanning microscope system of claim 600, the second imaging light path further comprising:
  5) a third polarizer optically coupled to the second objective lens, the third polarizer located between the second illuminator and the movable slide stage, and
  6) a second analyzer optically coupled to the second objective lens, the second analyzer comprising a rotatable fourth polarizer, wherein the second analyzer is located between the second objective lens and the second digital video camera;

the compact slide scanning microscope further comprising
  l) a second analyzer motor mechanically coupled to the rotatable fourth polarizer, located within said case, and capable of rotating the rotatable fourth polarizer through a rotational range of at least 90 degrees.

700. A compact slide scanning microscope system for capturing images of a birefringent microscope slide specimen and transmitting the images to a monitor for display, the compact slide scanning microscope system comprising:

a slide scanning microscope comprising:

a) a movable slide stage for holding a microscope slide having a specimen thereon, wherein the slide stage is movable in a plane in an X-axis direction and a Y-axis direction perpendicular to the X-axis direction;

b) an X-axis slide stage motor capable of moving the movable slide stage in the X-axis direction;

c) a Y-axis slide stage motor capable of moving the movable slide stage in the Y-axis direction;

d) an overview camera for capturing an overview image of the specimen;

e) a first imaging light path for capturing an image of the microscope slide specimen, the first imaging light path comprising:
  1) a first illuminator comprising a light source for illuminating the slide specimen;
  2) first illuminator optics for regulating the light from the first illuminator
  3) a first objective lens, optically coupled to the first illuminator, for magnifying light received from the specimen at a first magnification;
  4) a first digital video camera optically coupled to the first objective lens, the first digital video camera having a CMOS digital image sensor operating as an M pixels by N lines digital pixel array and outputting video images as a series of frames, each frame comprising N lines each having M pixels of data;
  5) a first polarizer optically coupled to the first objective lens, the first polarizer located between the first illuminator and the movable slide stage, and
  6) a first analyzer optically coupled to the first objective lens, the first analyzer comprising a rotatable second polarizer, wherein the analyzer is located between the first objective lens and the first digital video camera f) a first objective lens motor mechanically coupled to the first objective lens, the first objective lens motor being capable of performing an objective lens movement to move the first objective lens to a desired stationary objective lens position;

g) a first analyzer motor mechanically coupled to the rotatable second polarizer and capable of rotating the rotatable second polarizer through a rotational range of at least 90 degrees;

h) a second imaging light path for capturing an image of the microscope slide specimen, the second imaging light path comprising:
1) a second illuminator comprising a light source for illuminating the slide specimen;
2) second illuminator optics for regulating the light from the second illuminator
3) a second objective lens, optically coupled to the second illuminator, for magnifying light received from the specimen at a second magnification;
4) a second digital video camera optically coupled to the second objective lens, the second digital video camera having a CMOS digital image sensor operating as an M pixels by N lines digital pixel array and outputting video images as a series of frames, each frame comprising N lines each having M pixels of data;

i) a second objective lens motor mechanically coupled to the second objective lens, the second objective lens motor being capable of performing an objective lens movement to move the second objective lens to a desired stationary objective lens position;

j) a microscope control unit comprising:
1) a high-speed computer interface for exchanging data and commands with a single board computer; and
2) a processor;

k) a single board computer comprising a slide scanning microscope control unit, the slide scanning microscope control unit being capable of receiving images or image portions from the first digital video camera and the second digital video camera via the high-speed computer interface;

l) a case comprising a housing for the movable slide stage, the X-axis and Y-axis slide stage motors, the overview camera, the first and second illuminators, the first and second illuminator optics, the first and second objective lenses, the first and second digital video cameras, the first and second objective lens motors, the first polarizer, the first analyzer, the first analyzer motor, and the microscope control unit, and the single board computer, wherein the case comprises a volume of no more than 0.4 cubic feet;

a monitor capable of displaying images received from the single board computer; and a user input/output device.

800. A compact slide scanning microscope system for capturing and displaying images of a birefringent microscope slide specimen, comprising:

a) a movable slide stage for holding a microscope slide having a specimen thereon, wherein the slide stage is movable in a plane in an X-axis direction and a Y-axis direction perpendicular to the X-axis direction;

b) an X-axis slide stage motor capable of moving the movable slide stage in the X-axis direction;

c) a Y-axis slide stage motor capable of moving the movable slide stage in the Y-axis direction;

d) an overview camera for capturing an overview image of the specimen;

e) a first imaging light path for capturing an image of the microscope slide specimen, the first imaging light path comprising:
1) a first illuminator comprising a light source for illuminating the slide specimen;
2) first illuminator optics for regulating the light from the first illuminator
3) a first objective lens, optically coupled to the first illuminator, for magnifying light received from the specimen at a first magnification;
4) a first digital video camera optically coupled to the first objective lens, the first digital video camera having a CMOS digital image sensor operating as an M pixels by N lines digital pixel array and outputting video images as a series of frames, each frame comprising N lines each having M pixels of data;
5) a first polarizer optically coupled to the first objective lens, the first polarizer located between the first illuminator and the movable slide stage, and
6) a first analyzer optically coupled to the first objective lens, the first analyzer comprising a rotatable second polarizer, wherein the analyzer is located between the first objective lens and the first digital video camera f) a first objective lens motor mechanically coupled to the first objective lens, the first objective lens motor being capable of performing an objective lens movement to move the first objective lens to a desired stationary objective lens position;

g) a first analyzer motor mechanically coupled to the rotatable second polarizer and capable of rotating the rotatable second polarizer through a rotational range of at least 90 degrees;

h) a second imaging light path for capturing an image of the microscope slide specimen, the second imaging light path comprising:
1) a second illuminator comprising a light source for illuminating the slide specimen;
2) second illuminator optics for regulating the light from the second illuminator
3) a second objective lens, optically coupled to the second illuminator, for magnifying light received from the specimen at a second magnification;
4) a second digital video camera optically coupled to the second objective lens, the second digital video camera having a CMOS digital image sensor operating as an M pixels by N lines digital pixel array and outputting video images as a series of frames, each frame comprising N lines each having M pixels of data;

i) a second objective lens motor mechanically coupled to the second objective lens, the second objective lens motor being capable of performing an objective lens movement to move the second objective lens to a desired stationary objective lens position;

j) a second analyzer motor mechanically coupled to the rotatable fourth polarizer and capable of rotating the rotatable fourth polarizer through a rotational range of at least 90 degrees;

k) a microscope control unit comprising:
1) a high-speed computer interface for exchanging data and commands with a computer system; and
2) a processor;

l) a case comprising a housing for the movable slide stage, the X-axis and Y-axis slide stage motors, the overview camera, the first and second illuminators, the first and second illuminator optics, the first and second objective lenses, the first and second digital video cameras, the first and second objective lens motors, the first and second analyzer motors, and the microscope control unit, wherein the case comprises a volume of no more than 0.4 cubic feet; and m) a computer system comprising:
1) a slide scanning microscope control unit, the slide scanning microscope control unit being capable of exchanging data and commands with the microscope control unit; and
2) a monitor capable of displaying images received from the first digital video camera and the second digital video camera.

The particular embodiments disclosed above are illustrative only, as the invention may be modified and practiced in different but equivalent manners apparent to those skilled in the art having the benefit of the teachings herein. Embodiments of the present invention disclosed and claimed herein may be made and executed without undue experimentation with the benefit of the present disclosure. While the invention has been described in terms of particular embodiments, it will be apparent to those of skill in the art that variations may be applied to systems and apparatus described herein without departing from the concept, spirit and scope of the invention. Examples are all intended to be non-limiting. It is therefore evident that the particular embodiments disclosed above may be altered or modified and all such variations are considered within the scope and spirit of the invention, which are limited only by the scope of the claims.

What is claimed is:

1. A method of preparing a field image of a portion of a target area of a microscope slide specimen using a slide scanning microscope, the slide scanning microscope having a movable slide stage for holding the microscope slide, an objective lens, and a digital video camera optically coupled to the objective lens, the digital video camera having a digital image sensor operating as an M pixels by N lines digital pixel array, the method comprising:
   performing a first movement to a first stationary position, the first movement selected from a slide stage movement and an objective lens movement, the first movement having a move time and a settle time;
   determining a line number S of a video frame F output by the digital video camera at the end of the settle time as a complete line;
   capturing, after the settle time has elapsed, a first field image portion comprising lines S to N of video frame F output by the digital video camera for the M pixels by N lines digital pixel array;
   capturing a second field image portion comprising lines 1 to (S−1) of video frame F+1 output by the digital video camera for the M pixels by N lines digital pixel array; and
   assembling the field image using the second field image portion from video frame F+1 and the first field image portion from video frame F.

2. The method of claim 1, wherein:
   the moveable slide stage comprises a generally planar stage capable of holding the microscope slide;
   the generally planar stage is moveable in an X-axis direction and a Y-axis direction perpendicular to the X-axis; and
   performing a first movement comprises performing a slide stage movement selected from an X-axis movement performed in an X-axis move time and having an X-axis settle time, and a Y-axis movement performed in a Y-axis move time and having a Y-axis settle time.

3. The method of claim 1, wherein:
   the objective lens of the slide scanning microscope is movable in a Z-axis direction generally perpendicular to the microscope slide to focus the field image at a desired focal plane within the microscope slide specimen,
   performing a first movement comprises performing an objective lens movement in a Z-axis direction to focus the field image at a desired focal plane within the microscope slide specimen, the objective lens movement having a Z-axis move time and a Z-axis settle time.

4. The method of claim 3, further comprising:
a) performing another objective lens movement to focus the field image at a desired focal plane;
b) repeating said steps of:
   determining a line number S of a video frame F output by the digital video camera at the end of the settle time as a complete line;
   capturing, after the settle time has elapsed, a first field image portion comprising lines S to N of video frame F output by the digital video camera for the M pixels by N rows digital pixel array;
   capturing a second field image portion comprising lines 1 to (S−1) of video frame F+1 output by the digital video camera for the M pixels by N rows digital pixel array; and
   assembling the field image using the second field image portion from video frame F+1 and the first field image portion from video frame F; and
c) optionally repeating steps a) and b) one or more times to obtain a plurality of field images having different focal planes.

5. The method of claim 4, further comprising:
   determining a focus value for each of said plurality of field images having different focal planes; and
   retaining the field image having the most appropriate focus value.

6. The method of claim 3, wherein performing an objective movement comprises moving the objective lens in a Z-axis direction while the digital image sensor and the movable stage remain stationary.

7. The method of claim 1, wherein determining a line number S occurs at a time selected from:
   before the move time has elapsed;
   before the settle time has elapsed; and
   after the settle time has elapsed.

8. The method of claim 1 wherein determining a line number S comprises determining a line number of the first complete line of a video frame F output by the digital video camera after the end of the settle time.

9. A method of preparing an image of a target area of a microscope slide specimen from a plurality of field images, each field image comprising an image of a portion of the target area of the slide specimen, using a slide scanning microscope having a movable slide stage for holding the microscope slide, an objective lens, and a digital video camera optically coupled to the objective lens, the digital video camera having a digital image sensor operating as an M pixels by N lines digital pixel array, the method comprising:
   capturing each field image of the plurality of field images by:
   a) performing a first movement to a desired stationary position, the first movement selected from a slide stage movement and an objective lens movement, the first movement having a move time and a settle time;

b) determining a line number S of a video frame F output by the digital video camera at the end of the settle time as a complete line;

c) capturing, after the settle time has elapsed, a first field image portion comprising lines S to N of video frame F output by the digital video camera for the M pixels by N lines digital pixel array;

d) capturing a second field image portion comprising lines 1 to (S−1) of video frame F+1 output by the digital video camera for the M pixels by N lines digital pixel array;

e) assembling the field image using the second field image portion from video frame F+1 and the first field image portion from video frame F;

f) repeating steps a-e for each field image in the plurality of field images; and g) assembling the plurality of field images to form a single image of the target area.

10. The method of claim 9, wherein:
the moveable slide stage comprises a generally planar stage capable of holding the microscope slide;
the generally planar stage is moveable in an X-axis direction and a Y-axis direction perpendicular to the X-axis; and
performing a first movement comprises performing a slide stage movement selected from an X-axis movement performed in an X-axis move time and having an X-axis settle time, and a Y-axis movement performed in a Y-axis move time and having a Y-axis settle time.

11. The method of claim 9, wherein:
the objective lens of the slide scanning microscope is movable in a Z-axis direction generally perpendicular to the microscope slide to focus the field image at a desired focal plane within the microscope slide specimen, and
performing a first movement comprises performing an objective lens movement in a Z-axis direction to focus the field image at a desired focal plane within the microscope slide specimen, the objective lens movement having a Z-axis move time and a Z-axis settle time.

12. The method of claim 11, further comprising:
h) performing another objective lens movement to focus the field image at a desired focal plane;
i) repeating said steps of:
determining a line number S of a video frame F output by the digital video camera at the end of the settle time as a complete line;
capturing, after the settle time has elapsed, a first field image portion comprising lines S to N of video frame F output by the digital video camera for the M pixels by N rows digital pixel array;
capturing a second field image portion comprising lines 1 to (S−1) of video frame F+1 output by the digital video camera for the M pixels by N rows digital pixel array; and
assembling the field image using the second field image portion from video frame F+1 and the first field image portion from video frame F; and
j) optionally repeating steps h) and i) one or more times to obtain a plurality of field images having different focal planes.

13. The method of claim 12, further comprising:
k) determining a focus value for each of said plurality of field images having different focal planes; and l) retaining the field image having the most appropriate focus value.

14. The method of claim 11, wherein performing an objective movement comprises moving the objective lens in a Z-axis direction while the digital image sensor and the movable stage remain stationary.

15. A method of preparing an image of a target area of a microscope slide specimen from a plurality of field images, each field image comprising an image of a portion of the target area of the slide specimen, using a slide scanning microscope having a moveable slide stage for holding the microscope slide, at least one objective lens, and a digital video camera having a digital image sensor operating as an M columns by N rows digital pixel array, the method comprising:
capturing each field image of the plurality of field images by:
a) performing a slide stage movement to move the slide stage to a desired stationary slide stage position, the slide stage movement having a move time and a settle time;
b) determining a line number S of a video frame F output by the digital video camera at the end of the settle time as a complete line;
c) capturing, after the settle time has elapsed, a first field image portion comprising lines S to N of video frame F output by the digital video camera for the M pixels by N lines digital pixel array;
d) capturing a second field image portion comprising lines 1 to (S−1) of video frame F+1 output by the digital video camera for the M pixels by N lines digital pixel array;
e) assembling the field image using the second field image portion from video frame F+1 and the first field image portion from video frame F;
f) performing an objective lens movement to a desired stationary objective lens position, the objective lens movement having a move time and a settle time;
g) determining a line number S of a video frame G output by the digital video camera at the end of the settle time as a complete line;
h) capturing, after the settle time has elapsed, a first field image portion comprising lines S to N of video frame G output by the digital video camera for the M pixels by N lines digital pixel array;
i) capturing a second field image portion comprising lines 1 to (S−1) of video frame G+1 output by the digital video camera for the M pixels by N lines digital pixel array;
j) repeating steps f-i to obtain a Z-stack of field images at the desired stationary slide stage position, each field image in the Z-stack of field images comprising an image having a different focus from the other images in the Z-stack;
k) retaining one field image of the Z-stack of field images as the field image for the desired stationary slide stage position;
l) repeating at least steps a-e to capture each of the plurality of field images; and
assembling the plurality of field images to form a single image of the target area.

16. The method of claim 12 wherein repeating at least steps a-e to capture each of the plurality of field images comprises repeating steps a-k for to capture each of the plurality of field images.

* * * * *